United States Patent
Perez et al.

(10) Patent No.: US 11,649,981 B2
(45) Date of Patent: May 16, 2023

(54) SYSTEMS AND METHODS FOR IMPROVING BUILDING CONTROL SYSTEMS VIA COMMAND COMPENSATION

(71) Applicant: Johnson Controls Technology Company, Auburn Hills, MI (US)

(72) Inventors: Carlos Felipe Alcala Perez, Milwaukee, WI (US); Timothy I. Salsbury, Mequon, WI (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 151 days.

(21) Appl. No.: 16/735,947

(22) Filed: Jan. 7, 2020

(65) Prior Publication Data
US 2021/0207836 A1 Jul. 8, 2021

(51) Int. Cl.
| F24F 11/48 | (2018.01) |
| F24F 11/36 | (2018.01) |
| F24F 11/49 | (2018.01) |
| G05B 19/418 | (2006.01) |

(52) U.S. Cl.
CPC .............. *F24F 11/48* (2018.01); *F24F 11/36* (2018.01); *F24F 11/49* (2018.01); *G05B 19/41865* (2013.01)

(58) Field of Classification Search
CPC ........ F24F 11/30; F24F 11/84; F24F 2110/30; F24F 11/48; F24F 11/36; F24F 11/49
See application file for complete search history.

(56) References Cited

U.S. PATENT DOCUMENTS

| 5,205,783 A * | 4/1993 | Dieckert ............... B08B 15/023 454/238 |
| 8,825,185 B2 | 9/2014 | Salsbury |
| 10,290,025 B1 * | 5/2019 | Howes ............... G06Q 30/0261 |
| 2007/0061064 A1 * | 3/2007 | Dollmeyer ............ F01N 13/009 701/114 |
| 2012/0170639 A1 * | 7/2012 | Salsbury .............. G05B 13/048 375/233 |
| 2013/0153062 A1 * | 6/2013 | Young ..................... F23N 1/002 137/557 |
| 2017/0293293 A1 * | 10/2017 | Brownie ............. G05B 23/0275 |
| 2018/0187909 A1 * | 7/2018 | Drees ........................ F24F 11/76 |
| 2018/0238577 A1 * | 8/2018 | Drees ........................ F24F 11/58 |
| 2019/0063780 A1 * | 2/2019 | Puttagunta ........... F24F 11/0001 |
| 2020/0386179 A1 * | 12/2020 | Chen ......................... F01P 3/02 |

* cited by examiner

*Primary Examiner* — Nelson J Nieves
(74) *Attorney, Agent, or Firm* — Foley & Lardner LLP

(57) ABSTRACT

A temperature control system. The control system includes a flow sensor configured to monitor water flow through a valve, an actuator coupled to the valve, and a first controller configured to establish a setpoint for a second controller. The second controller monitors fluid flow through the valve and combines a weighted first command from the first controller and a weighted second command from the second controller to generate a control signal, wherein combining the weighted first command and the weighted second command is based on the reliability of the flow sensor. The second controller further controls the actuator based on the control signal.

20 Claims, 17 Drawing Sheets

SYSTEMS AND METHODS FOR IMPROVING BUILDING CONTROL SYSTEMS VIA COMMAND COMPENSATION

BACKGROUND

The present disclosure relates generally to a building control system and more particularly to a temperature control system optimizing the flow from the output of a valve based on command compensation.

Consistent fluid flow (e.g., water flow) in control valves can be important to maintain desirable temperature conditions in HVAC systems. Fluid (e.g., water) may need to be utilized as a medium of heat transfer inside of heating, ventilating, or air conditioning (HVAC) piping to allow for heating or cooling of air supplied by an air handling unit, thereby adjusting the temperature of a building zone. Controlling the temperature and rate at which water flows through the piping can be important for maintaining stable temperatures within a building zone. However in some instances, the valves cannot maintain the desired water flow when pressure disturbances arise.

SUMMARY

One implementation of the present disclosure is a temperature control system for use with a flow sensor associated with a valve and an actuator coupled to the valve. The temperature control system includes a first controller and a second controller. The first controller is configured to provide a flow rate setpoint for the second controller and a first flow command for the second controller. The second controller is configured to monitor fluid flow through the valve, generate a second flow command, and provide a control signal for the actuator in response to a weighted value of the first flow command. The first flow command and second flow command are related to reliability of the flow sensor.

In some embodiments, providing the control signal for the actuator in response to the weighted value of the first flow command includes providing the control signal for the actuator in response to the weighted value of the first flow command or in response to the weighted value of the second flow command or both.

In some embodiments, providing the control signal for the actuator in response to the weighted value of the first flow command includes partially receiving the first flow command from the first controller as a portion of the control signal such that the weight of the first flow command is substantially zero when the flow sensor is consistently reliable and providing a feedback signal from second controller as a portion of the control signal such that the weight of the feedback signal is substantially zero when the flow sensor is consistently unreliable, wherein the feedback signal comprises flow rate measurements to act as feedback from the flow sensor to the second controller.

In some embodiments, providing the control signal for the actuator in response to the weighted value of the first flow command includes operating reliably when the flow sensor is providing accurate readings to the second controller substantially more frequently than when the flow sensor is providing inaccurate readings to the second controller in a predetermined time period. It further includes operating unreliably when the flow sensor is providing inaccurate readings to the second controller substantially more frequently than when the flow sensor is providing accurate readings to the second controller in a predetermined time period.

In some embodiments providing the control signal for the actuator in response to the weighted value of the first flow command comprises weighting the first flow command by a scaling factor, wherein the scaling factor is based on a reliability of the flow sensor and is a constant value when the flow sensor is consistently reliable or unreliable.

In some embodiments, providing the control signal for the actuator in response to the weighted value of the first flow command comprises averaging, with a moving average filter, a plurality of measurements from the flow sensor to determine if the flow sensor is consistently reliable or unreliable.

In some embodiments, providing the control signal for the actuator in response to the weighted value of the first flow command comprises receiving, in a building zone, the flow rate setpoint for the second controller, the second controller configured to reach the flow setpoint by adjusting the water flow through the valve.

In some embodiments, the actuator, the second controller, and the flow sensor are configured to operate within a single actuator assembly.

Another implementation of the present disclosure is a temperature control device. The temperature control device includes a flow sensor configured to monitor flow through a valve, an actuator coupled to the valve, and a control system. The control system is configured to monitor fluid flow through the valve and combine a first flow command and a second flow command to generate a control signal. The first flow command and the second flow command are combined at least partially in response to reliability of the flow sensor.

In some embodiments, combining the first flow command and the second flow command to generate a control signal includes providing the first flow command from a first controller such that the weight of the first flow setpoint is substantially zero when the flow sensor is consistently reliable and providing a second flow command from a second controller such that the weight of the second flow command is substantially zero when the flow sensor is consistently unreliable.

In some embodiments, combining the first flow command and the second flow command to generate a control signal comprises combining the first flow command and the second flow command in a third controller.

In some embodiments, combining the first flow command and the second flow set command to generate a control signal includes operating reliably when the flow sensor is providing accurate readings to the control system substantially more frequently than when the flow sensor is providing inaccurate readings to the control system in a predetermined time period and operating unreliably when the flow sensor is providing inaccurate readings to the control system substantially more frequently than when the flow sensor is providing accurate readings to the control system in a predetermined time period.

In some embodiments, combining the first flow command and the second flow set command to generate a control signal comprises scaling the value of the first flow command and the second flow command such that the scaling of the first flow command and the second flow command is at least partially based on the reliability of the flow sensor.

In some embodiments, combining the first flow command and the second flow command to generate a control signal comprises averaging, with a moving average filter, a plurality of measurements from the flow sensor to determine if the flow sensor is consistently reliable or unreliable.

In some embodiments, the control system is further configured to generate the control signal to adjust the water flow through the valve.

In some embodiments, the actuator, the control system, and the flow sensor are configured to operate within a single actuator assembly.

Another implementation of the present disclosure is a method of controlling an actuator for a valve, where the valve controls fluid flow. The method includes receiving a first flow setpoint for the fluid flow from a first controller in response to temperature of an environment. The method further includes receiving a second flow setpoint from a second controller in response to an error value. The method further includes providing, via the second controller, a control signal to the actuator, wherein the control signal is provided using the first flow setpoint and the second flow setpoint, and a reliability of the flow sensor.

In some embodiments, providing the control signal to the actuator includes providing the first flow command from the first controller such that the weight of the first flow setpoint is substantially zero when the flow sensor is consistently reliable and providing the second flow command from the second controller such that the weight of the second flow setpoint is substantially zero when the flow sensor is consistently unreliable.

In some embodiments, providing the control signal to the actuator includes operating reliably when the flow sensor is providing accurate readings to the second controller substantially more frequently than when the flow sensor is providing inaccurate readings to the second controller in a predetermined time period and operating unreliably when the flow sensor is providing inaccurate readings to the second controller substantially more frequently than when the flow sensor is providing accurate readings to the second controller in a predetermined time period.

In some embodiments, receiving the second flow command in response to an error value comprises receiving the second flow setpoint in response to a different between the second flow setpoint and feedback from the flow sensor.

DETAILED DESCRIPTION

Overview

Referring generally to the FIGURES, a building control system with one or more controllers configured to optimize the water flow through piping within an HVAC system is shown. The HVAC system includes a means to regulate the flow based on temperature and a means to regulate flow based on the current water flow rate. When the required amount of water flowing through the HVAC system is smaller than what the sensor flow can read, the controller may not be able to adjust the valve positioning accordingly and the system performance can degrade. In some embodiments, a method of monitoring fluid flow when the sensor is unreliable is utilized.

In some embodiments, the system includes a flow controller configured to monitor the flow of water through a valve and a temperature controller configured to monitor the temperature of a building zone. The controllers are arranged such that the temperature controller determines the setpoint for the flow controller (i.e., a cascaded control system). To optimize the flow of the water through the HVAC system, the flow controller monitors and adjusts the flow rate by means of a flow sensor placed at or near a valve to achieve the setpoint set by the temperature controller. If the flow sensor is unreliable at certain times (e.g., providing no values, providing incorrect values), compensation actions can be provided in some embodiments.

Compensation action can be achieved by using a weighted linear combination of the commands from the controllers monitoring water flow through a water flow sensor and the commands of a controller monitoring temperature, wherein the linear combination of these commands is received by an actuator to adjust a valve in the HVAC system. The control system is configured to utilize this output command compensation such that the weighting of each part of the linear combination varies with the reliability of the flow sensor.

Building with HVAC System

Figure 1:
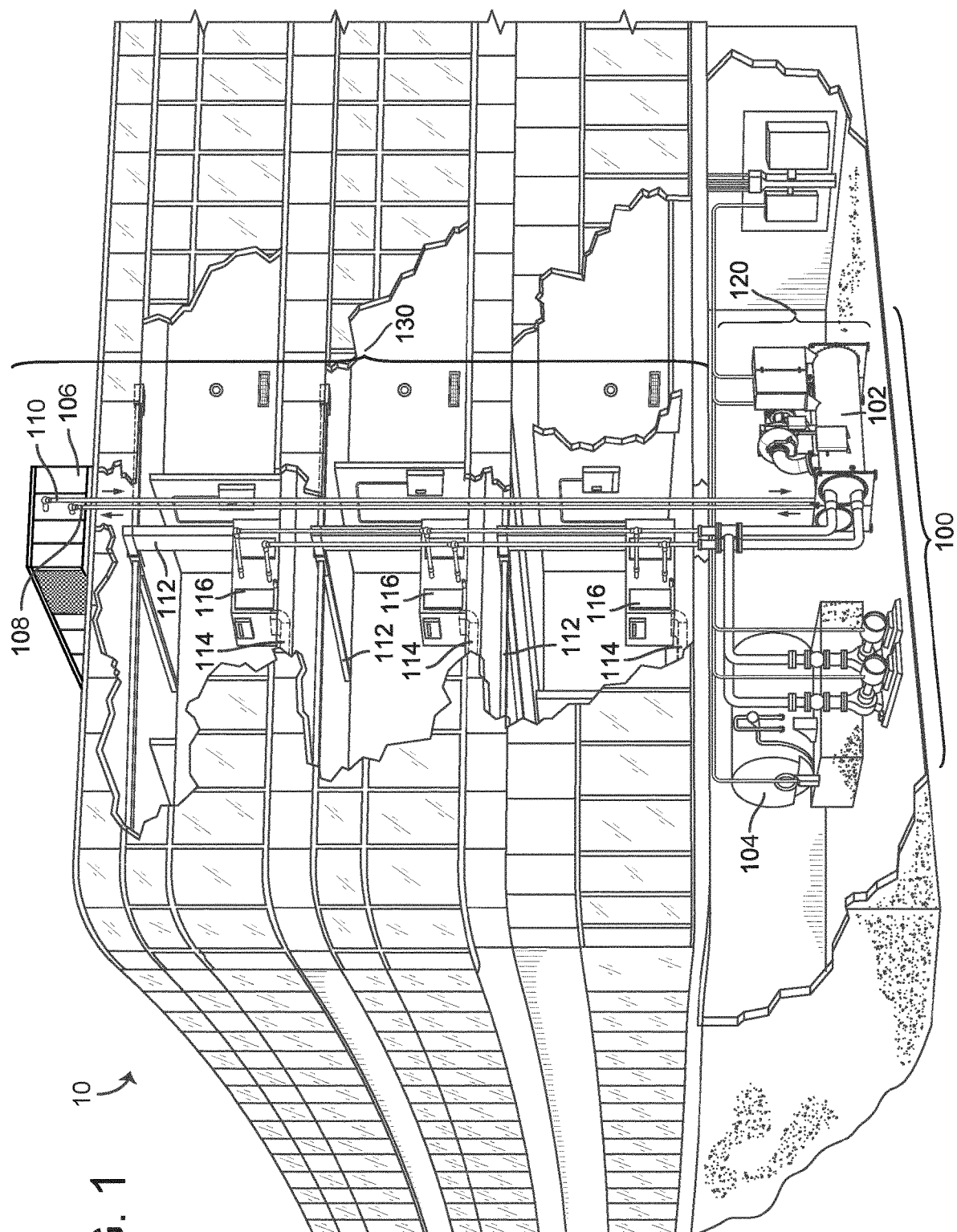
FIG. 1 is a drawing of a building equipped with a HVAC system, according to an exemplary embodiment.

Referring now to FIG. 1, a perspective view of a building 10 is shown. Building 10 is served by a building automation system (BAS). A BAS is, in general, a system of devices configured to control, monitor, and manage equipment in or around a building or building area. A BAS can include, for example, a HVAC system, a security system, a lighting system, a fire alerting system, any other system that is capable of managing building functions or devices, or any combination thereof.

The BAS that serves building 10 includes an HVAC system 100. HVAC system 100 may include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. In some embodiments, waterside system 120 is replaced with a central energy plant such as central plant 200, described with reference to FIG. 2.

Still referring to FIG. 1, HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 may be located in or around building 10 (as shown in FIG. 1) or at an offsite location such as a central plant (e.g., a chiller plant, a steam plant, a heat plant, etc.). The working fluid may be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 may be transported to AHU 106 via piping 108.

AHU 106 may place the working fluid in a heat exchange relationship with an airflow passing through AHU 106 (e.g., via one or more stages of cooling coils and/or heating coils). The airflow may be, for example, outside air, return air from within building 10, or a combination of both. AHU 106 may transfer heat between the airflow and the working fluid to provide heating or cooling for the airflow. For example, AHU 106 may include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 may include dampers or other flow control elements that can be operated to control an amount of the supply airflow provided to individual zones of building 10. In other embodiments, airside system 130 delivers the supply airflow into one or more zones of building 10 (e.g., via air supply ducts 112) without using intermediate VAV units 116 or other flow control elements. AHU 106 may include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Central Plant and Control System

Figure 2:
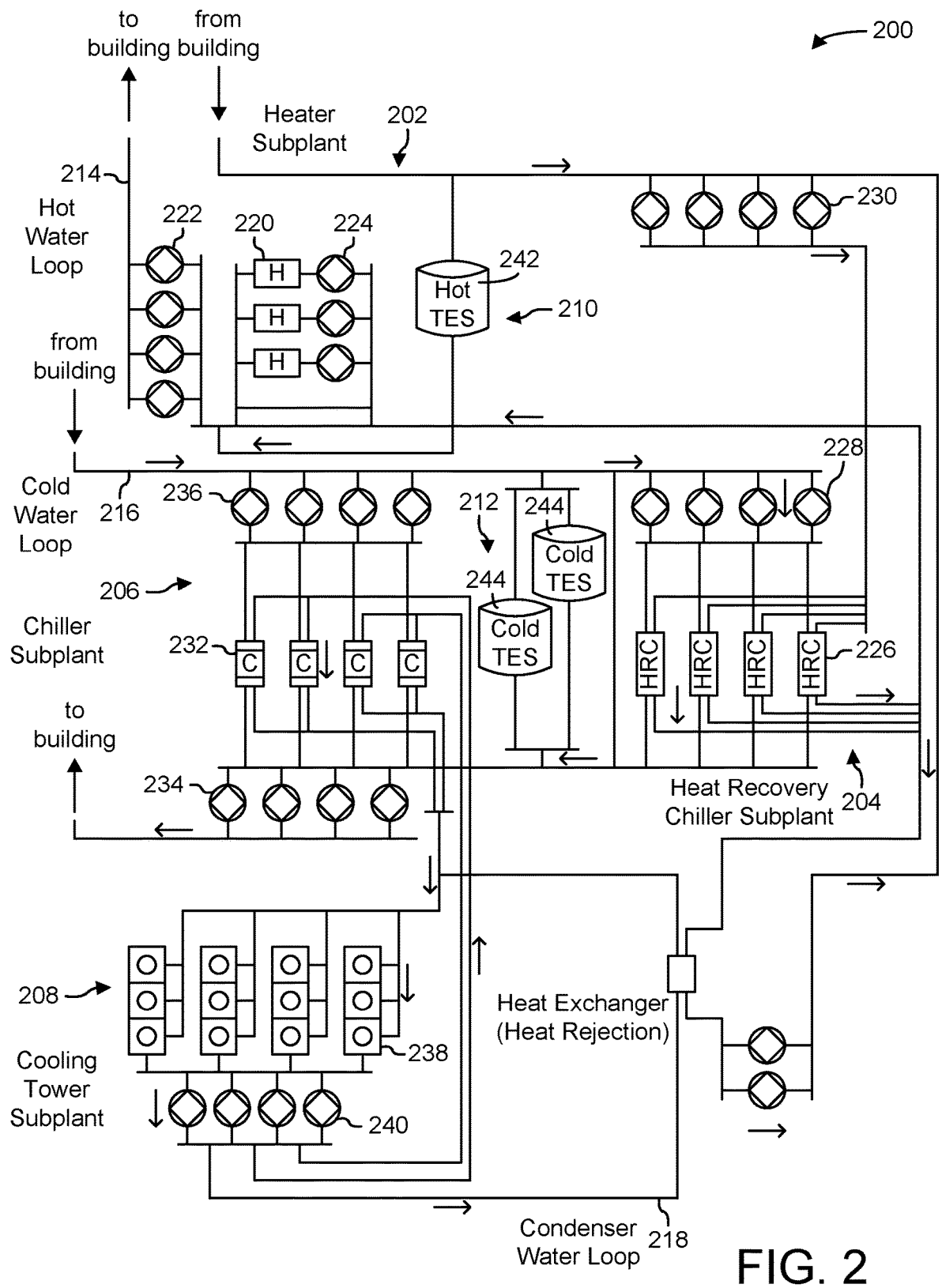
FIG. 2 is a schematic of a waterside system which can be used as part of the HVAC system of FIG. 1, according to some embodiments.

Referring now to FIG. 2, a block diagram of a central plant 200 is shown, according to an exemplary embodiment. In brief overview, central plant 200 may include various types of equipment configured to serve the thermal energy loads of a building or campus (i.e., a system of buildings). For example, central plant 200 may include heaters, chillers, heat recovery chillers, cooling towers, or other types of equipment configured to serve the heating and/or cooling loads of a building or campus. Central plant 200 may consume resources from a utility (e.g., electricity, water, natural gas, etc.) to heat or cool a working fluid that is circulated to one or more buildings or stored for later use (e.g., in thermal energy storage tanks) to provide heating or cooling for the buildings. In various embodiments, central plant 200 may supplement or replace waterside system 120 in building 10 or may be implemented separate from building 10 (e.g., at an offsite location).

Central plant 200 is shown to include a plurality of subplants 202-212 including a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources from utilities to serve the thermal energy loads (e.g., hot water, cold water, heating, cooling, etc.) of a building or campus. For example, heater subplant 202 may be configured to heat water in a hot water loop 214 that circulates the hot water between heater subplant 202 and building 10. Chiller subplant 206 may be configured to chill water in a cold water loop 216 that circulates the cold water between chiller subplant 206 building 10. Heat recovery chiller subplant 204 may be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air may be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, $CO_2$, etc.) may be used in place of or in addition to water to serve the thermal energy loads. In other embodiments, subplants 202-212 may provide heating and/or cooling directly to the building or campus without requiring an intermediate heat transfer fluid. These and other variations to central plant 200 are within the teachings of the present invention.

Each of subplants 202-212 may include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in central plant 200 (e.g., pumps 222, 224, 228, 230, 234, 236, and/or 240) or pipelines in central plant 200 include an isolation valve associated therewith. Isolation valves may be integrated with the pumps or positioned upstream or downstream of the pumps to control the fluid flows in central plant 200. In various embodiments, central plant 200 may include more, fewer, or different types of devices and/or subplants based on the particular configuration of central plant 200 and the types of loads served by central plant 200.

Figure 3:
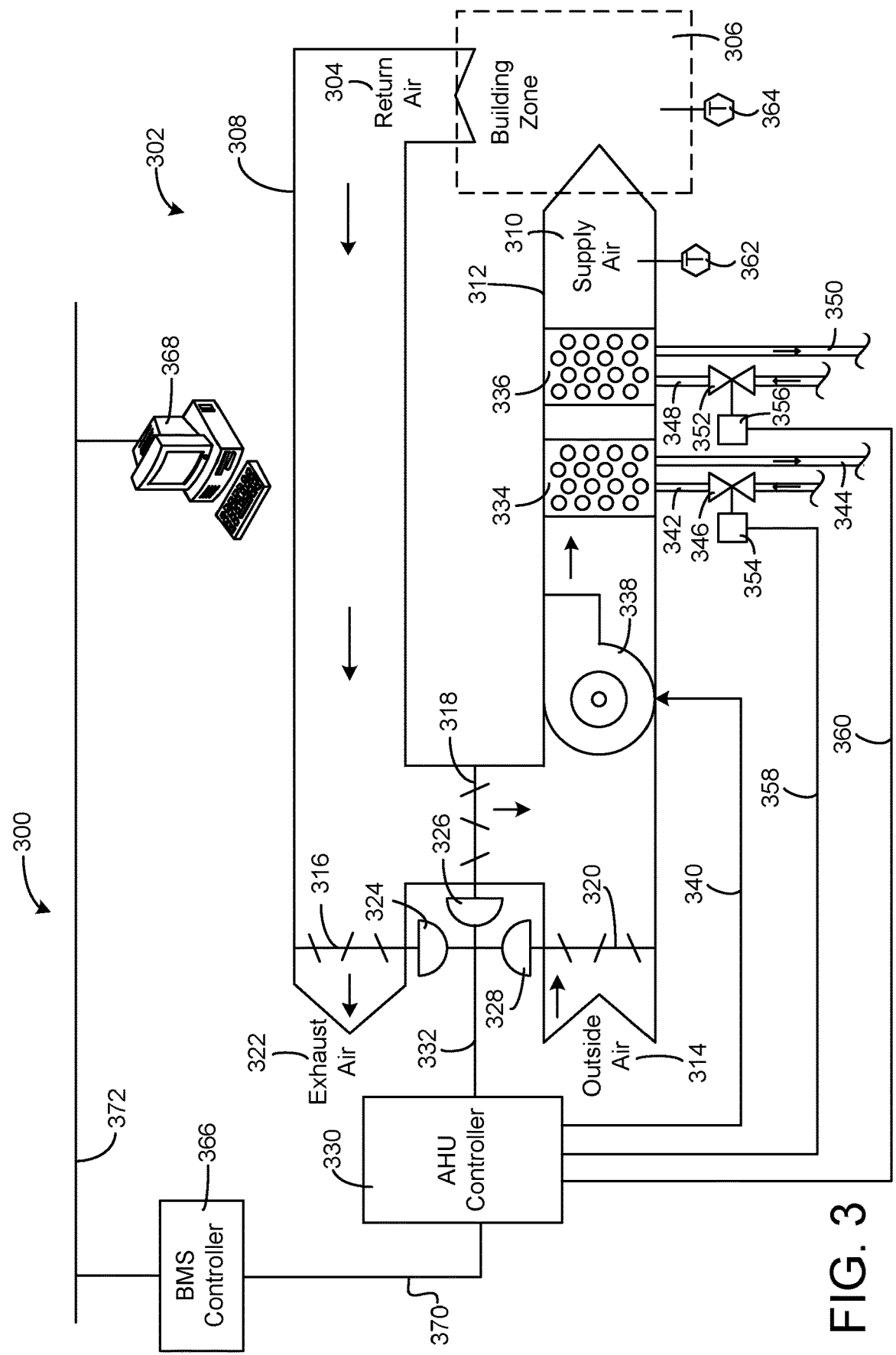
FIG. 3 is a block diagram of an airside system which can be used as part of the HVAC system of FIG. 1, according to some embodiments.

Referring now to FIG. 3, a block diagram of an airside system 300 is shown, according to an example embodiment. In various embodiments, airside system 300 can supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, duct 112, duct 114, fans, dampers, etc.) and can be located in or around building 10. Airside system 300 can operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 can receive return air 304 from building zone 306 via return air duct 308 and can deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 can communicate with an AHU controller 330 via a communications link 332. Actuators 324-328 can receive control signals from AHU controller 330 and can provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 can communicate with fan 338 via communications link 340 to control a flow rate of supply air 310. In some embodiments, AHU controller 330 controls an amount of heating or cooling applied to supply air 310 by modulating a speed of fan 338.

Cooling coil 334 can receive a chilled fluid from waterside system 200 (e.g., from cold water loop 216) via piping 342 and can return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 can receive a heated fluid from waterside system 200 (e.g., from hot water loop 214) via piping 348 and can return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 can communicate with AHU controller 330 via communications links 358-360. Actuators 354-356 can receive control signals from AHU controller 330 and can provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 can also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 can control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 can communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 can provide BMS controller 366 with temperature measurements from temperature sensors 362 and 364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 can communicate with BMS controller 366 and/or AHU controller 330 via communications link 372.

Figure 4:
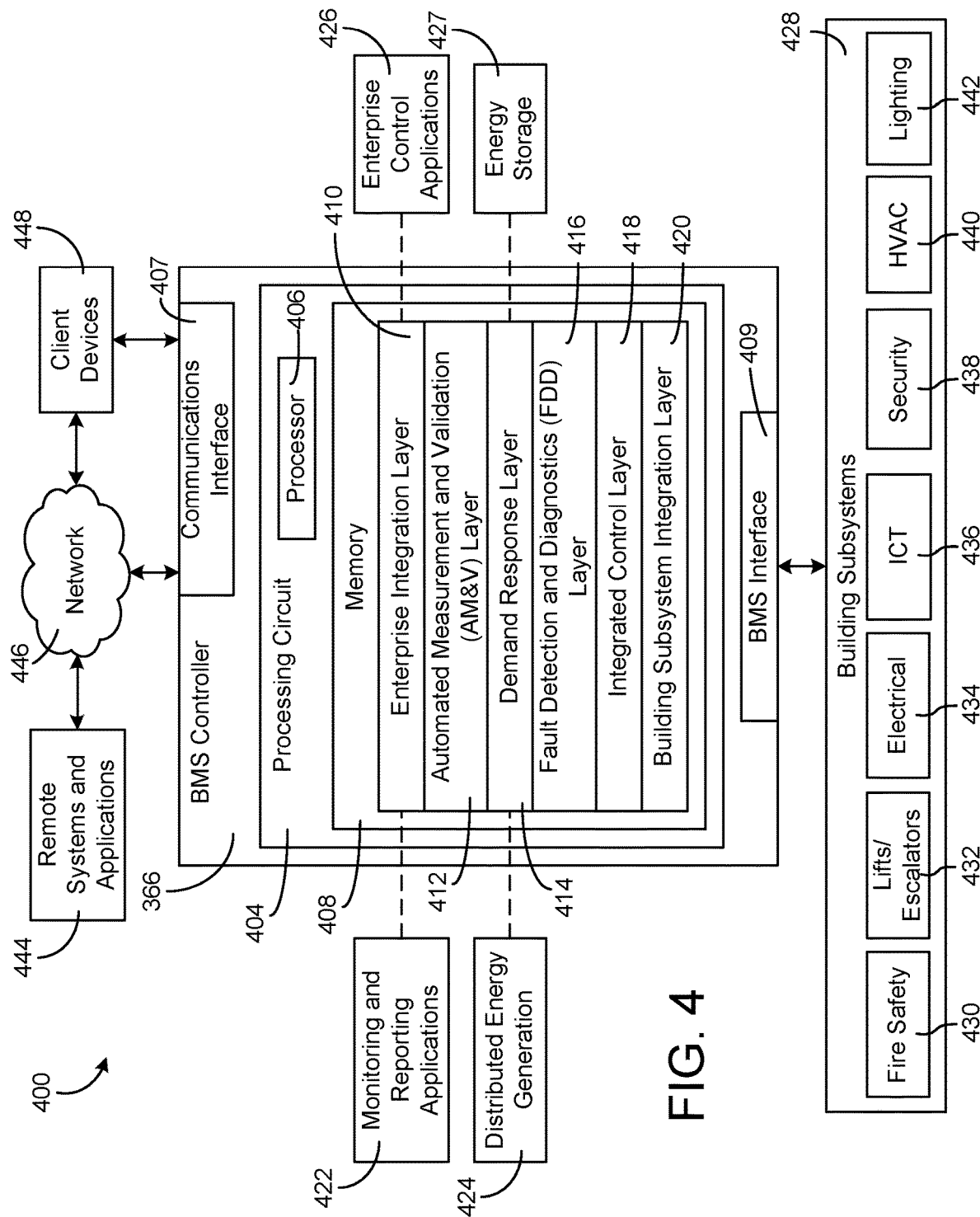
FIG. 4 is a block diagram of a BMS which can be used in the building of FIG. 1, according to some embodiments.

Referring now to FIG. 4, a block diagram of a building management system (BMS) 400 is shown, according to an example embodiment. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 can also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2 and 3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices (e.g., card access, etc.) and servers, or other security-related devices.

Still referring to FIG. 4, BMS controller 366 includes a communications interface 407 and a BMS interface 409. Interface 407 can facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 can also facilitate communications between BMS controller 366 and client devices 448. BMS interface 409 can facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 can include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to an example embodiment, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 can also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 can receive sensor data and input signals from building subsystems 428 and provide output data and control signals to building subsystems 428. Building subsystem integration layer 420 can also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 can receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs can also include inputs such as electrical use (e.g., expressed in kWh), thermal load measurements, pricing information, projected pricing, smoothed pricing, curtailment signals from utilities, and the like.

According to an example embodiment, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 can also include control logic configured to determine when to utilize stored energy. For example, demand response layer 414 can determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models can represent collections of building equipment (e.g., subplants, chiller arrays, etc.) or individual devices (e.g., individual chillers, heaters, pumps, etc.).

Demand response layer 414 can further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In an example embodiment, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints can also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 can compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 can receive data inputs from integrated control layer 418, directly from one or more building subsystems or devices, or from another data source. FDD layer 416 can automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other example embodiments, FDD layer 416 is configured to provide "fault" events to integrated control layer 418 which executes control strategies and policies in response to the received fault events. According to an example embodiment, FDD layer 416 (or a policy executed by an integrated control engine or business rules engine) can shut-down systems or direct control activities around faulty devices or systems to reduce energy waste, extend equipment life, or assure proper control response.

FDD layer 416 can be configured to store or access a variety of different system data stores (or data points for live data). FDD layer 416 can use some content of the data stores to identify faults at the equipment level (e.g., specific chiller, specific AHU, specific terminal unit, etc.) and other content to identify faults at component or subsystem levels. For example, building subsystems 428 can generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Feedback Control System

Figure 5:
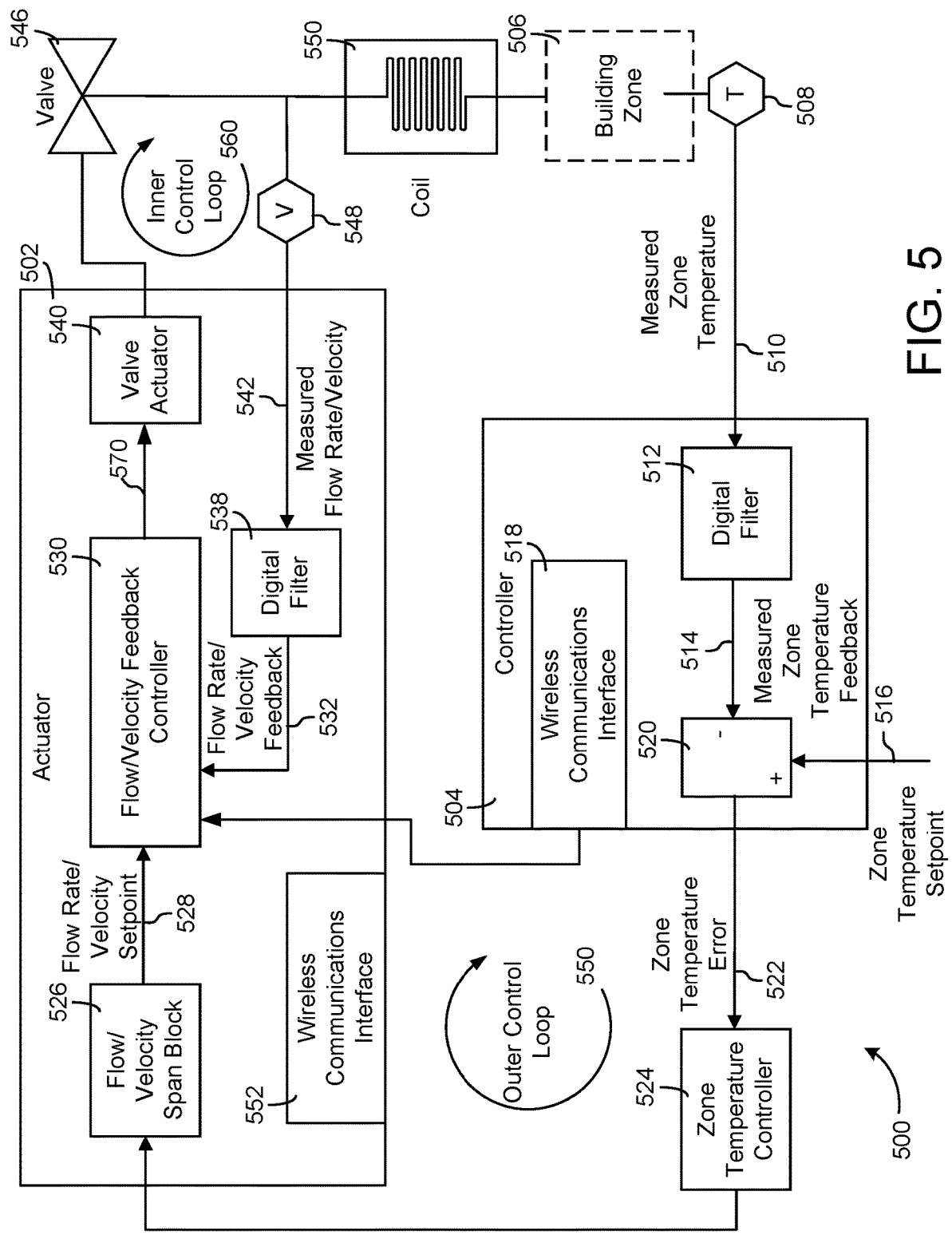
FIG. 5 is a block diagram of a feedback control system which can be implemented in the waterside system of FIG. 2, according to some embodiments.

Turning now to FIG. 5, a block diagram of an actuator device 502 within a feedback control system 500 is shown. In some embodiments, the feedback control system 500 is a cascaded feedback control system. In some embodiments, a primary controller (e.g., controller 504) generates a control signal that serves as the setpoint for a secondary controller (e.g., flow/velocity feedback controller 530). Outer control loop 550 is shown to include zone temperature controller 524, actuator 502, and controller 504 in series with feedback from measured zone temperature data 510. In some embodiments, outer control loop 550 includes an inner control loop configured to modulate fluid flow from valve 546 based on feedback from flow sensor 548, as shown as inner control loop 560. In some embodiments, feedback control system 500 is a component or subsystem of waterside system 200, as described with reference to FIG. 2. In other embodiments, feedback control system 500 is a component or subsystem of HVAC system 100, airside system 300, or BMS 400, as described with reference to FIGS. 1-4.

Feedback control system 500 may include, among other components, actuator 502, controller 504, building zone 506, zone temperature controller 524, and valve 546. In some embodiments, controller 504 is a primary controller for the components of an HVAC system (e.g., HVAC system 100) within the outer control loop of feedback control system 500. In other embodiments, controller 504 is a thermostat or a BMS controller (e.g., for BMS 400). In still further embodiments, controller 504 is a user device configured to run a building management application (e.g., a mobile phone, a tablet, a laptop). Controller 504 may receive data from temperature sensor 508. Temperature sensor 508 may be any type of sensor or device configured to measure an environmental condition (e.g., temperature) of a building zone 506. Building zone 506 may be any subsection of a building (e.g., a room, a block of rooms, a floor, etc.).

Controller 504 is shown to include a digital filter 512, a wireless communications interface 518, and a comparator 520. Measured zone temperature data 510 from temperature sensor 508 may be received as an input signal to digital filter 512. Digital filter 512 may be configured to convert the measured zone temperature data 510 into a measured zone temperature feedback signal 514 that may be provided as an input to comparator 520. In some embodiments, digital filter 512 is a first order low pass filter. In other embodiments, digital filter 512 may be a low pass filter of a different order or a different type of filter.

Controller 504 is further shown to include wireless communications interface 518. In some embodiments, wireless communications interface 518 may communicate data from controller 504 to communications interface 552 of actuator device 502. In other embodiments, communications interfaces 518 and 552 may communicate with other external systems or devices. Communications via interface 518 may be direct (e.g., local wireless communications) or via a communications network (e.g., a WAN, the Internet, a cellular network). For example, interfaces 518 and 552 may include a Wi-Fi transceiver for communicating via wireless communications network. In another example, one or both interfaces 518 and 552 may include cellular or mobile phone communications transceivers. In some embodiments, multiple controllers and smart actuator devices may communicate using a mesh topology. In other embodiments, communications interfaces 518 and 552 may be configured to transmit smart actuator device data (e.g., a fault status, an actuator and/or valve position) to an external network. In still further embodiments, communications interfaces 518 and 552 are connected via a wired, rather than wireless, network.

Comparator 520 may be configured to compare the measured zone temperature feedback signal 514 output from digital filter 512 with a zone temperature setpoint value 516. Comparator 520 may then output a temperature error signal 522 that is received by zone temperature controller 524. Comparator 520 may be a discrete electronics part or implemented as part of controller 504. If comparator 520 determines that the zone temperature feedback signal 514 is higher than the zone temperature setpoint value 516 (i.e., building zone 506 is hotter than the setpoint value), zone temperature controller 524 may output a control signal that causes actuator device 502 to modify the flow rate through coil 550 such that cooling to building zone 506 is increased. If comparator 520 determines that the zone temperature feedback signal 514 is lower than the zone temperature setpoint value 516 (i.e., building zone 506 is cooler than the setpoint value), zone temperature controller 524 may output a control signal that causes actuator device 502 to modify the flow rate through coil 550 such that heating to building zone 506 is increased.

In various embodiments, zone temperature controller 524 is a pattern recognition adaptive controller (PRAC), a model recognition adaptive controller (MRAC), or another type of tuning or adaptive feedback controller. Adaptive control is a control method in which a controller may adapt to a controlled system with associated parameters which vary, or are initially uncertain. Zone temperature controller 524 may be incorporated fully into controller 504. In some embodiments, zone temperature controller 524 is similar or identical to the adaptive feedback controller described in U.S. Pat. No. 8,825,185, granted on Sep. 2, 2014, the entirety of which is herein incorporated by reference.

Still referring to FIG. 5, actuator device 502 is shown to include a flow/velocity span block 526, a flow/velocity feedback controller 530, a valve actuator 540, and a communications interface 552. Zone temperature error 522 output from comparator 520 may be transmitted to actuator 502 via zone temperature controller 524. In some embodiments, zone temperature error may also be received by flow/velocity feedback controller 530. This may be done for more controlling based on the temperature measurements from temperature sensor 508. The functionality and operation of receiving both zone temperature error 522 and flow rate velocity feedback 532 at flow/velocity feedback controller 530 is described in greater detail below, with reference to FIGS. 7-11. Flow/velocity span block 526 may be configured to enforce allowable maximum and minimum flow range limits on the received zone temperature error 522. For example, a technician installing the components of cascaded control system 500 or an administrator of HVAC system 100 may input a maximum and/or a minimum flow range limit for the flow/velocity span block 526. In some embodiments, the flow range limits are transmitted via mobile device (e.g., a smart phone, a table) and are received via communications interface 552 of actuator device 502. In other embodiments, the flow range limits are transmitted to interface 552 via wired network. The maximum and/or minimum flow range limits may be utilized in the calibration process of a flow rate sensor.

Flow/velocity feedback controller 530 is configured to receive a flow rate/velocity setpoint signal 528 from flow/velocity span block 526 and a flow rate/velocity feedback signal 532 from digital filter 538. The combination of these signals being received at flow/velocity feedback controller 530 is described in greater detail in FIGS. 6-11. Flow/velocity feedback controller 530 is further configured to output a command signal (e.g., valve command 570) to valve actuator 540. Valve command 570 may be improved by means of command compensation, as discussed in greater detail below. In an exemplary embodiment, flow/velocity feedback controller 530 is a proportional variable deadband controller (PVDC) configured to implement a proportional variable deadband control technique. In other embodiments, the flow/velocity feedback controller 530 is a pattern recognition adaptive controller (PRAC), a model recognition adaptive controller (MRAC), or another type of tuning or adaptive feedback controller. In other embodiments, flow/velocity feedback controller 530 operates using state machine or proportional-integral-derivative (PID) logic.

Flow/velocity feedback controller 530 may be configured to output an actuator control signal (e.g., a DC signal, an AC signal) to valve actuator 540. For example, valve actuator 540 may be a linear actuator (e.g., a linear proportional actuator), a non-linear actuator, a spring return actuator, or a non-spring return actuator. Valve actuator 540 may include a drive device coupled to valve 546 and configured to rotate a shaft of valve 546. In various embodiments, valve 546 may be a 2-way or 3-way two position electric motorized valve, a ball isolation valve, a floating point control valve, an adjustable flow control device, or a modulating control valve.

Still referring to FIG. 5, feedback control system 500 is further shown to include a flow rate sensor 548. Flow rate sensor 548 may be any desired style of flow rate sensor. For example, in various embodiments, flow rate sensor 548 may be an ultrasonic transducer flow sensor, a heated thermistor flow sensor, or a vortex-shedding flowmeter. In some embodiments, flow rate sensor 548 may be disposed upstream of valve 546 to measure the flow rate and/or velocity of fluid entering valve 546. In other embodiments, flow rate sensor 548 may be disposed downstream of valve 546 to measure the flow rate and/or velocity of fluid exiting valve 546. Once collected, measured flow rate and/or velocity data 542 from flow rate sensor 548 may be provided to flow/velocity feedback controller 530 of actuator device 502.

Fluid (e.g., water, water/glycol solution) that passes through valve 546 may flow through coil 550. In some embodiments, valve 546 is used to modulate an amount of heating or cooling provided to the supply air for building zone 506. In various embodiments, coil 550 may be used to achieve zone setpoint temperature 516 for the supply air of building zone 506 or to maintain the temperature of supply air for building zone 506 within a setpoint temperature range. The position of valve 546 may affect the amount of heating or cooling provided to supply air via coil 550 and may correlate with the amount of energy consumed to achieve a desired supply air temperature.

It will be appreciated that system 500 as shown in FIG. 5 is merely one example of a feedback control system in which the control techniques described herein can be implemented and that such techniques are applicable to a variety of different systems. For example, the control device responsible for transmitting control signals to valve actuator 540 (e.g., flow/velocity feedback controller) may be an external controller (i.e., outside of actuator 502). In some embodiments, both feedback signals from measured zone temperature 510 and measured flow rate/velocity 542 are received by an external controller, such as controller 504.

Figure 6A:
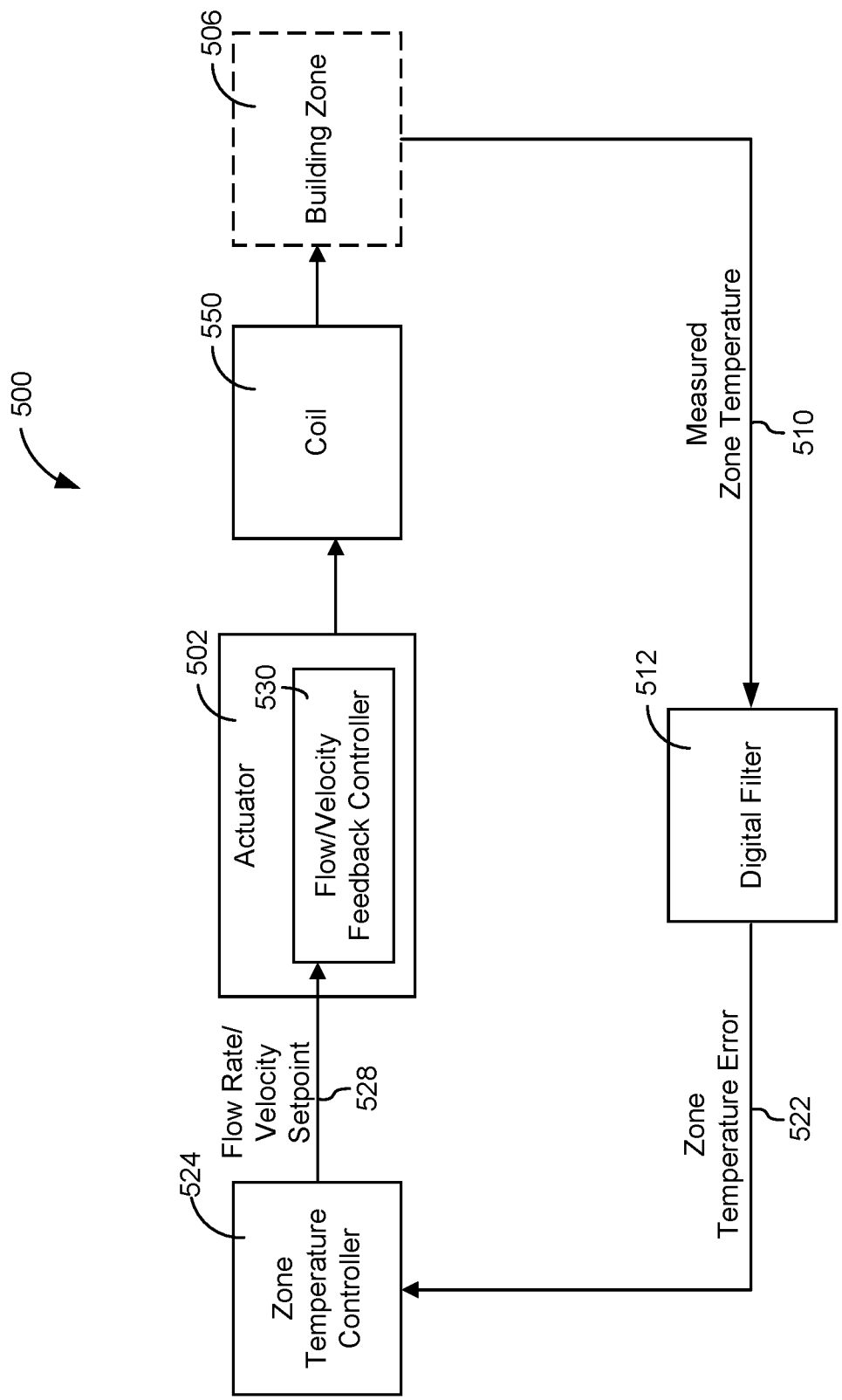
FIG. 6A is a block diagram of the outer loop of a feedback control system which can implemented in the feedback control system of FIG. 5, according to some embodiments.
Figure 6B:
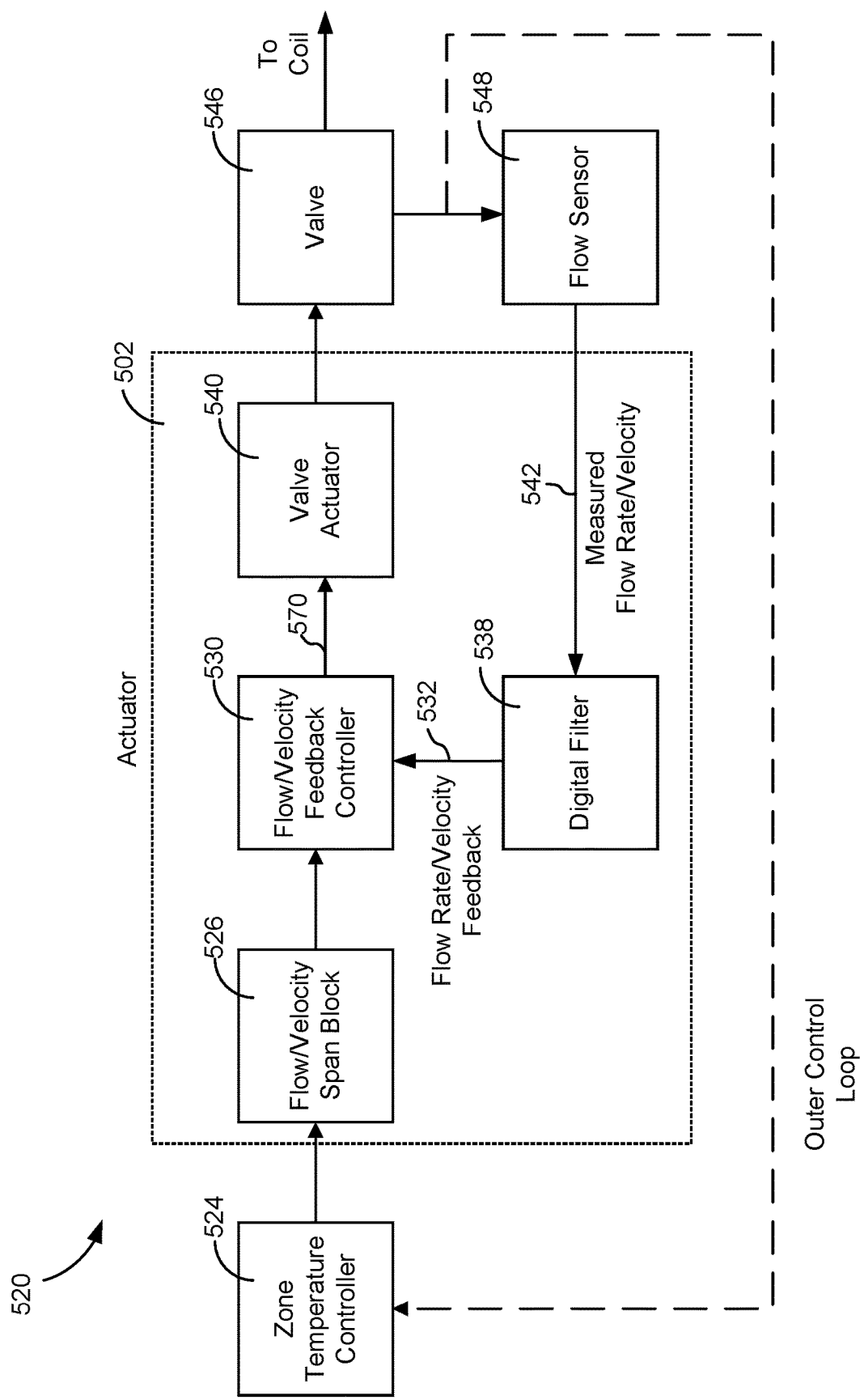
FIG. 6B is a block diagram of the inner loop a feedback control system which can implemented in the feedback control system of FIG. 5, according to some embodiments.

Referring now to FIGS. 6A-B, high-level block diagrams of feedback control system 500 are depicted. FIG. 6A is shown to depict a high-level diagram of the outer loop of feedback control system 500 as depicted in FIG. 5 and FIG. 6B is shown to depict a high-level diagram of the inner loop of feedback control system 500, as shown in FIG. 5.

Command Compensation

Figure 7A:
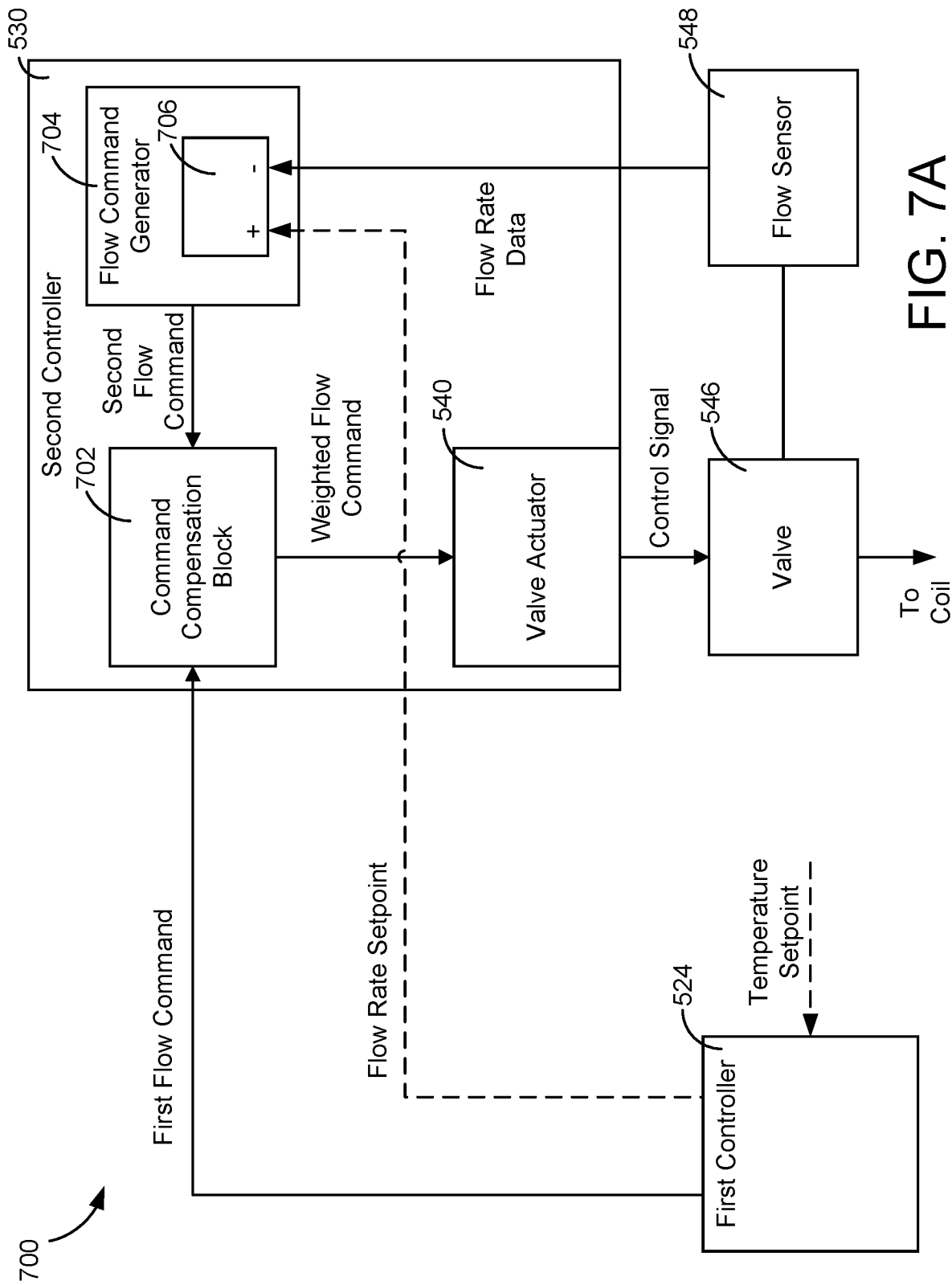
FIG. 7A is a high-level block diagram of a feedback control system implementing command compensation which can implemented in the feedback control system of FIG. 5, according to some embodiments.
Figure 12:
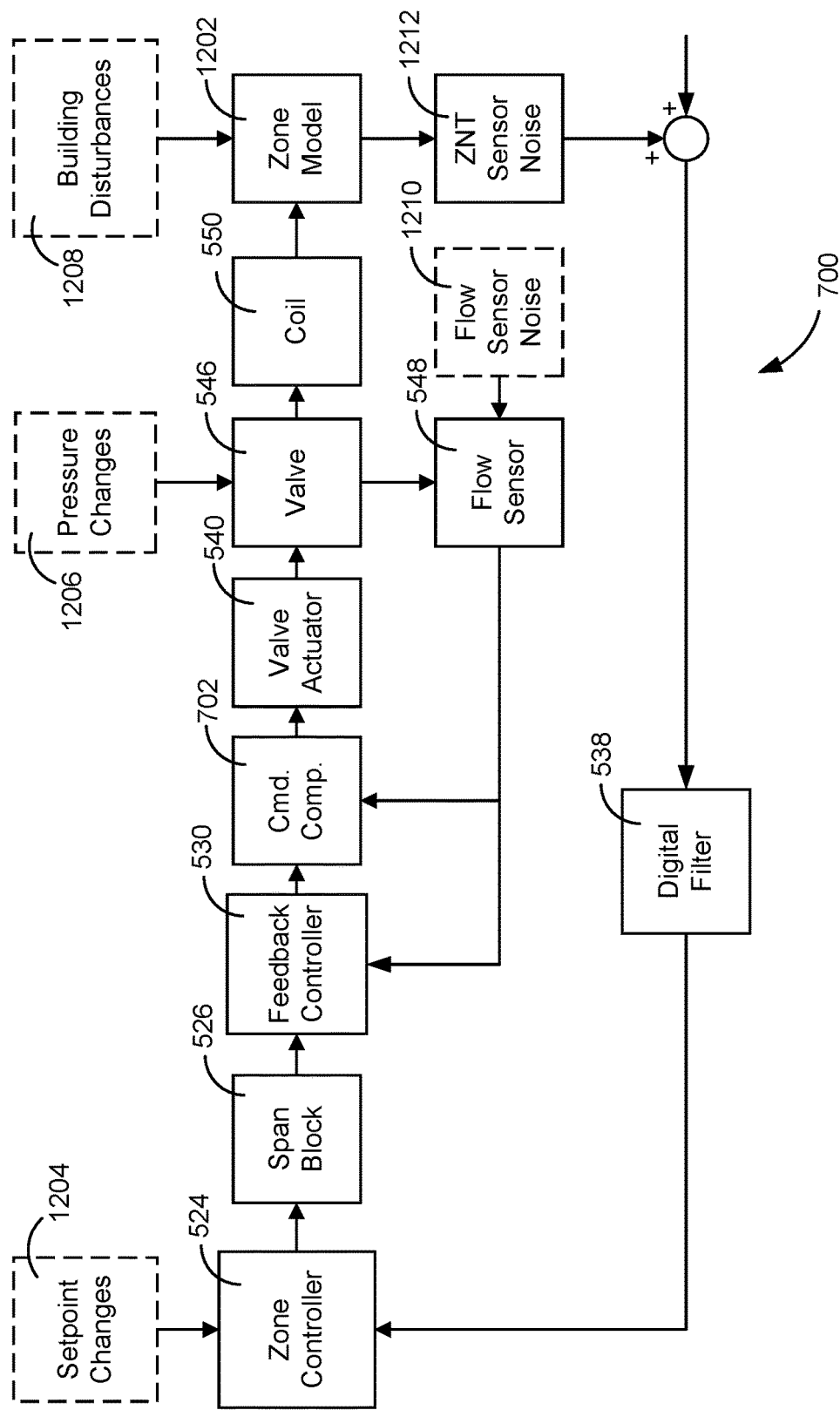
FIG. 12 is a block diagram of a feedback control system implementing command compensation which can implemented in the feedback control system of FIG. 5, according to some embodiments.

Referring now to FIG. 7A, a high-level block diagram of flow control loop 700 is shown. In some embodiments, flow control loop 700 can be fully incorporated in system 500. In various embodiments, the high-level functionality and configurations of elements can be incorporated into various embodiments of other systems or loops as described herein (e.g., system 500, system 520, flow control loop 700 as shown in FIG. 12, etc.). Loop 700 is shown to include first controller 524 and second controller 530. First controller 524 and second controller 530 are referred to at a high level and may be referred to a temperature controller (e.g., zone temperature controller 524, controller 504, etc.) or flow/velocity feedback controller 530, respectively. Loop 700 is shown to further include valve 546 and flow sensor 548. Second controller 530 is shown to include command compensation block 702, flow command generator 704, and valve actuator 540. Command compensation block 702 may be responsible for combining the flow commands from the first controller 524 and second controller 530 and is described in greater detail below. Flow command generator may include any processing component within a controller (e.g., second controller 530) responsible for generating a flow command (e.g., second flow command as shown in FIG. 7A). In some embodiments, generating the flow command is based on flow rate data provided by flow sensor 548. Second controller 530 is shown to include comparator 706. Comparator 706 may be identical or substantially similar to comparator 520. In some embodiments, comparator 706 takes in the flow rate setpoint form first controller 524 and the flow rate data from flow sensor 548 and generators a second flow command for command compensation block 702. Details regarding various embodiments of the system shown in FIG. 7A are detailed below.

Figure 7B:
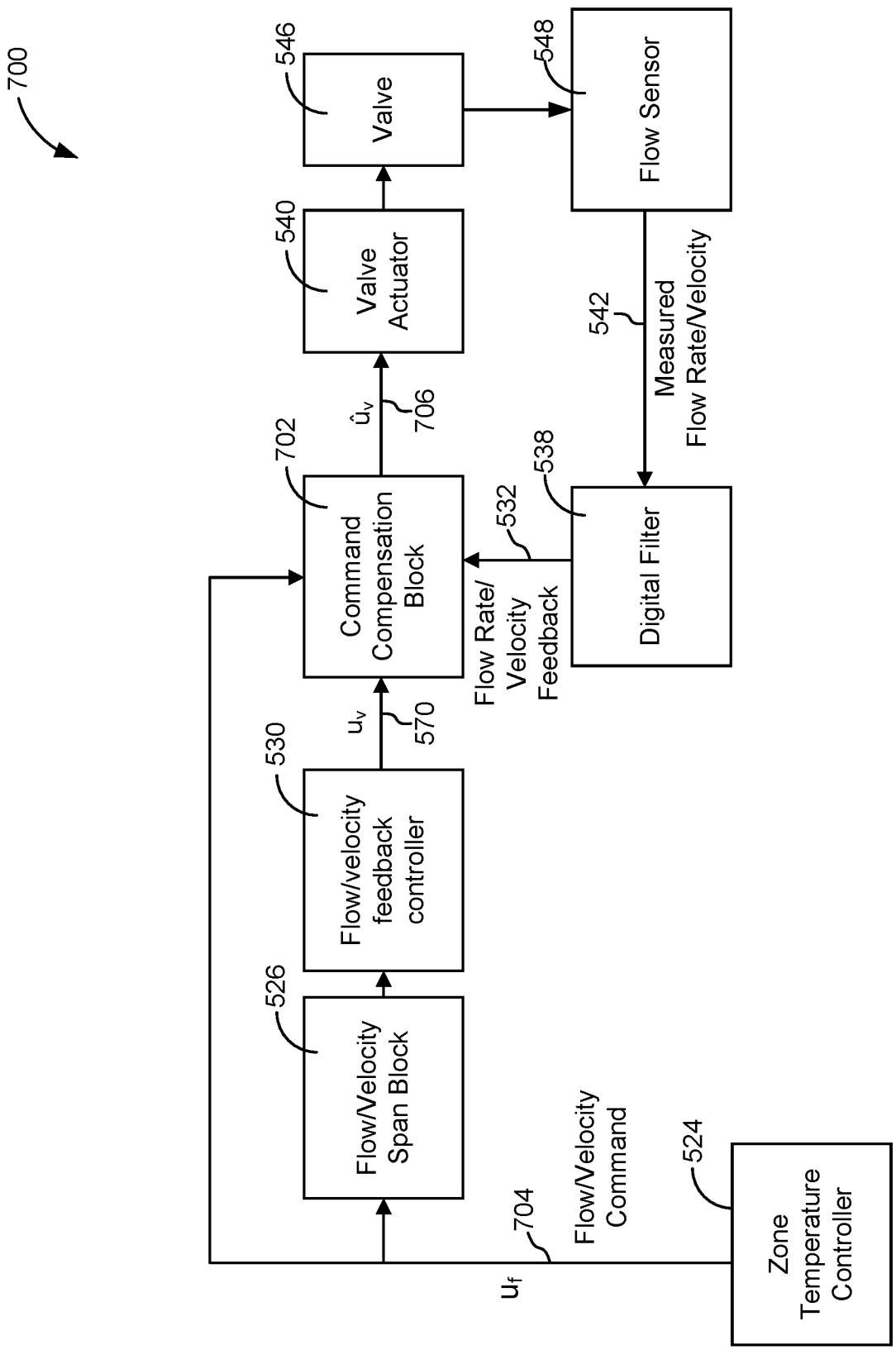
FIG. 7B is a block diagram of a feedback control system implementing command compensation which can implemented in the feedback control system of FIG. 5, according to some embodiments.

Referring now to FIG. 7B, a flow control loop 700 including command compensation is shown. Flow control loop 700 may be incorporated fully into system 500. Flow control loop 700 includes command compensation block 702 and which may act as a subsystem of flow/velocity feedback controller 530. Command compensation block 702 is shown to be a signal processing block that inputs a combination of signals from zone temperature controller 524 and flow sensor 548. In some embodiments, the functionality of command compensation block 702 is performed by flow/velocity feedback controller 530. In other embodiments, command compensation block 702 is performed by an external controller, such as controller 504. Command compensation block 702 can be performed by any controller within flow control loop 700, and may be performed by a control device not shown in FIG. 7B. In the exemplified embodiment, command compensation block 702 inputs a linear combination of commands such that:

$$\hat{u}_v = \alpha \mu_f + (1-\alpha)\mu_v \quad (1)$$

Where $u_v$ is the valve command 570, $\hat{u}_v$ is the compensated valve command 706, $\mu_f$ is the flow/velocity command 704 from the zone temperature controller 524, and $\alpha$ is a scaling factor that ranges between 0 and 1.

In some embodiments, the variable $\alpha$ is a parameter that allows for transitioning from using valve command 570 exclusively when we have reliable measurements from flow sensor 548 to incorporating flow/velocity command 704 when there are unreliable sensor readings from flow sensor 548. In some embodiments, flow/velocity command 704 is incorporated into command compensation block 702 when the sensor experiences a fault. For example, a value of $\alpha=0$ would allow valve actuator 540 to receive valve command 570 (e.g., no added command compensation); this case would happen when the flow readings from flow sensor 548 are measurable. Conversely, a value of $\alpha=1$ would allow valve actuator 540 to only receive flow/velocity command 704 from zone temperature controller 524; this would be the case in the event of sensor faults, or when the flow rate is in the non-measureable region for an extended period of time; for these cases it is very easy to select the value of α. In another example, flow α=0.5 may allow valve actuator 540 to receive both valve command 570 and flow/velocity command 704 of equal or similar weight.

In some embodiments, the flow rate can become volatile. The flow rate may become volatile such that flow sensor 548 is measuring readable and unreadable flow rates within a short period of time, switching the value of α between 0 and 1 may create stability problems. For example, flow sensor 548 may measure the flow rate as 1.2 gallons per minute (gpm), which at or near the actual flow rate of the water (e.g., actual flow rate is 1.29 gpm). After a short period of time (e.g., <2 seconds), flow sensor 548 may measure the flow rate as 0.0 gpm. The actual flow rate of the water may not be 0.0 gpm in this instance (e.g., actual flow rate may be 0.6 gpm), but the flow rate is below the minimum specifications of flow sensor 548 and therefore is measured at a value of 0.0 gpm. In other embodiments, the flow rate did not drop to 0.6 gpm but rather 1.25 gpm. In this exemplary embodiment, flow sensor 548 still measured the flow rate as 0.0 gpm, but this time the error was due to a sensor malfunction. For these and similar situations, implementing a value of α in between 0 and 1 may be beneficial.

Therefore, there may be at least two situations where a can be calculated: during normal operation (e.g., valve actuator 540 receiving valve command 570 as shown in FIG. 6B), and the extreme cases (e.g., valve actuator 540 receiving compensated valve command 706 as shown in FIG. 7B). Both situations may be differentiated since the value of α is calculated differently for each case. In order to ease differentiation, the parameter α will have a different name for each case. For example, under normal operation, the parameter will be called 13, and during extreme cases it will be called γ. The value of γ will be calculated with an exponentially weighted moving average (EWMA) that moves between 0 and 1. The EWMA uses the token value a calculated at each sample time as $$\alpha = \begin{cases} 1, \text{if } y_f \text{ is unreliable} \\ 0, \text{if } y_f \text{ is reliable} \end{cases} \quad (2)$$

and the parameter γ is updated as $$\gamma = \gamma + \frac{1}{T_\gamma}(\alpha - \gamma) \quad (3)$$

The time constant $T_\gamma$ may be set to a time value (e.g., one day) in order to respond when flow sensor 548 is unable to measure the flow rate, when the sensor faults, or when the sensor starts reading flow again after not reading it for a period of time (e.g., more than 1 min., more than 10 min., etc.).

Figure 7C:
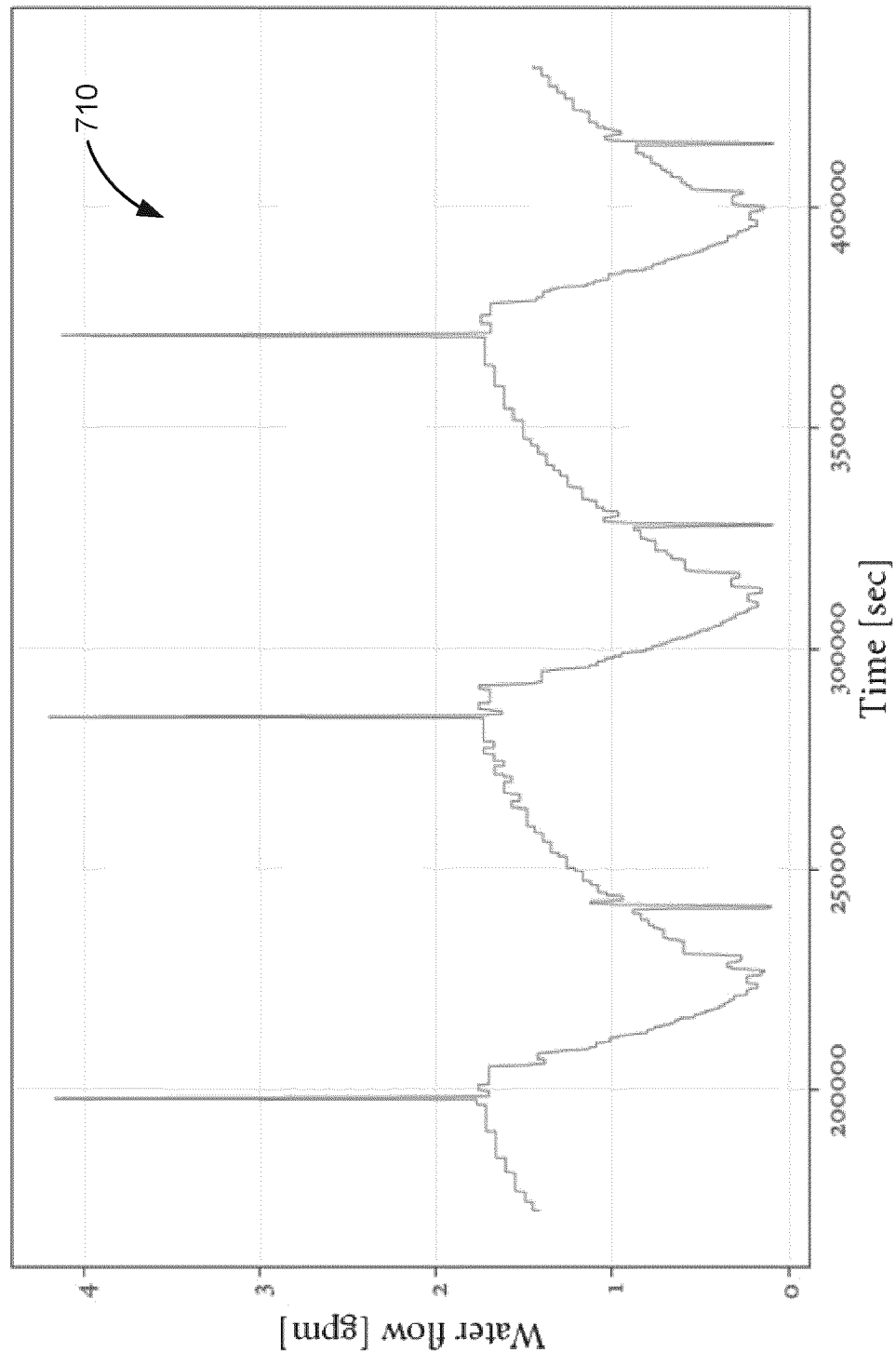
FIG. 7C is a graph of water flow versus time, which can implemented in the feedback control system of FIG. 5, according to some embodiments.

Referring now to FIGS. 7B-C flow may be volatile, and flow readings from flow sensor 548 may vary greatly within a short period of time. In such an exemplary embodiment, β is used to represent α. The value of β is calculated from the portion of flow measured by the sensor. This portion depends on the flow profile and the minimum readable flow. Graph 710 of FIG. 7C shows the profile of water flow through a valve controlled with perfect sensing (e.g., all values are being accurately read by flow sensor 548).

Figure 7D:
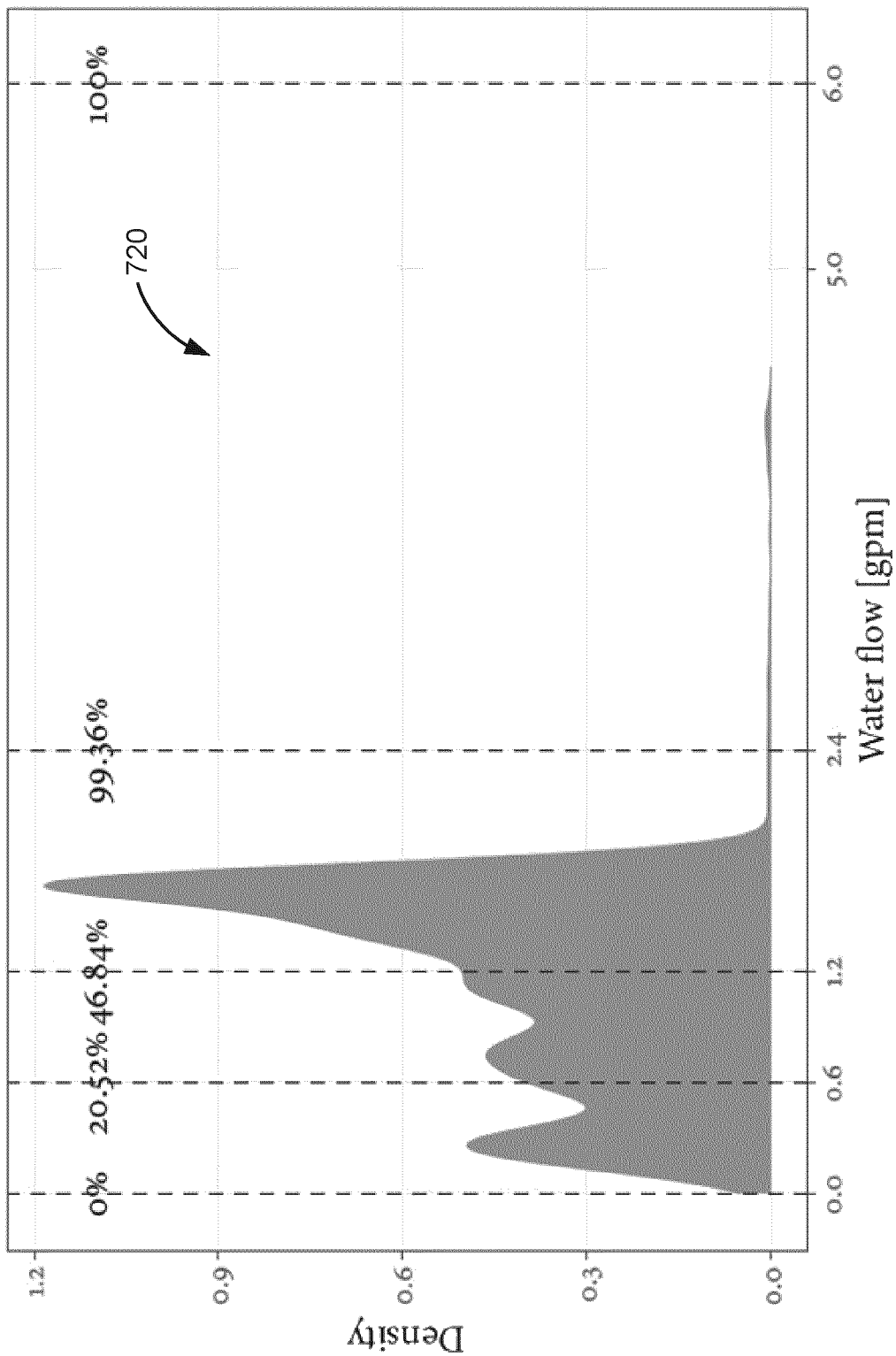
FIG. 7D is a graph of water flow versus density, which can implemented in the feedback control system of FIG. 5, according to some embodiments.

Graph 720 of FIG. 7D shows a distribution of the water flow in valve 546 in an exemplary embodiment. The vertical lines in Graph 2 show the cumulative probability for several flow values. The cumulative probability for a given value gives the probability that the water flow is lower than that value, and this may be the same as the portion of the flow levels that cannot be measured. For example, a sensor with $y_{min}$=0 gpm will have any water flow level be read by flow sensor 548, making β=0. For $y_{min}$=0:6 gpm, 20:52% of the water flow will not be read; thus, β=0:2052. For $y_{min}$=1:2 gpm, β=0:4684; for $y_{min}$=2:4 gpm, β=0:9936, and for $y_{min}$=6 gpm, β=1.

In a general exemplary embodiment, a represents the weight for the combined control commands, β represents a parameter proportional to the flow in the non-measureable region, and γ represents the consistency of sensing. For example, a may begin at a value of zero when flow readings are reliable. As unreliable readings begin to get received by flow sensor 548, the values of β and γ may begin to increase. In some embodiments, the β value is determined based on a cumulative probability (e.g., EWMA filter) for how much flow is in the non-measureable region. This β value may be a general proportion and may not change significantly over a long period of time (e.g., 1 day). When γ increases/decreases and reaches a value near 0 or 1, this may be representative of the consistency of readings received by flow sensor 548. When the value for γ is near 0 or 1 (e.g., γ>0.99; or γ<1 0.01), the value of α may switch to the value of γ, as γ is now indicative of a consistently reliable or consistently unreliable flow rate. When the value for γ is not near 0 or 1, the flow rate measurements are not consistently reliable or consistently unreliable, and the value of alpha may equal the value of β.

In some embodiments, output compensation block 702 may be implemented within a processing circuit of flow/velocity feedback controller 530 as an algorithm. Pseudocode that may be implemented in such an algorithm is shown below.

```
/*
Variables
  y_f: Flow sensor output
  uf: Flow command
  uv: Valve command
  v: Compensated valve command
  α: Weight for control commands
  β: Proportion of .ow in non-measurable region
  γ: Value that determines extreme sensing condition
  τ_α: Time constant of EWMA filter for α
  τ_β: Time constant of EWMA filter for β
  τ_γ: Time constant of EWMA filter for γ
  α: Binomial token with values of 0 or 1
  θ: Binomial token with values of β or γ
*/
Initialization
  α=0
  β=0
  γ=0
Command compensation
  if y_f is unreliable then:

a = 1
  else
    a = 0
  end if
```

$$\beta = \beta + \frac{1}{\tau_\beta}(\alpha - \beta)$$

$$\gamma = \gamma + \frac{1}{\tau_\gamma}(\alpha - \gamma)$$

if $\gamma \geq 0.99$; or $\gamma \leq 0.01$ then
$\theta = \gamma$
else
$\theta = \beta$
end if $$\alpha = \alpha + \frac{1}{\tau} * \alpha(\theta - a)$$

$$\hat{u}_f = \alpha u_f + (1 - a)u_v$$

Command Compensation Process

Figure 8A:
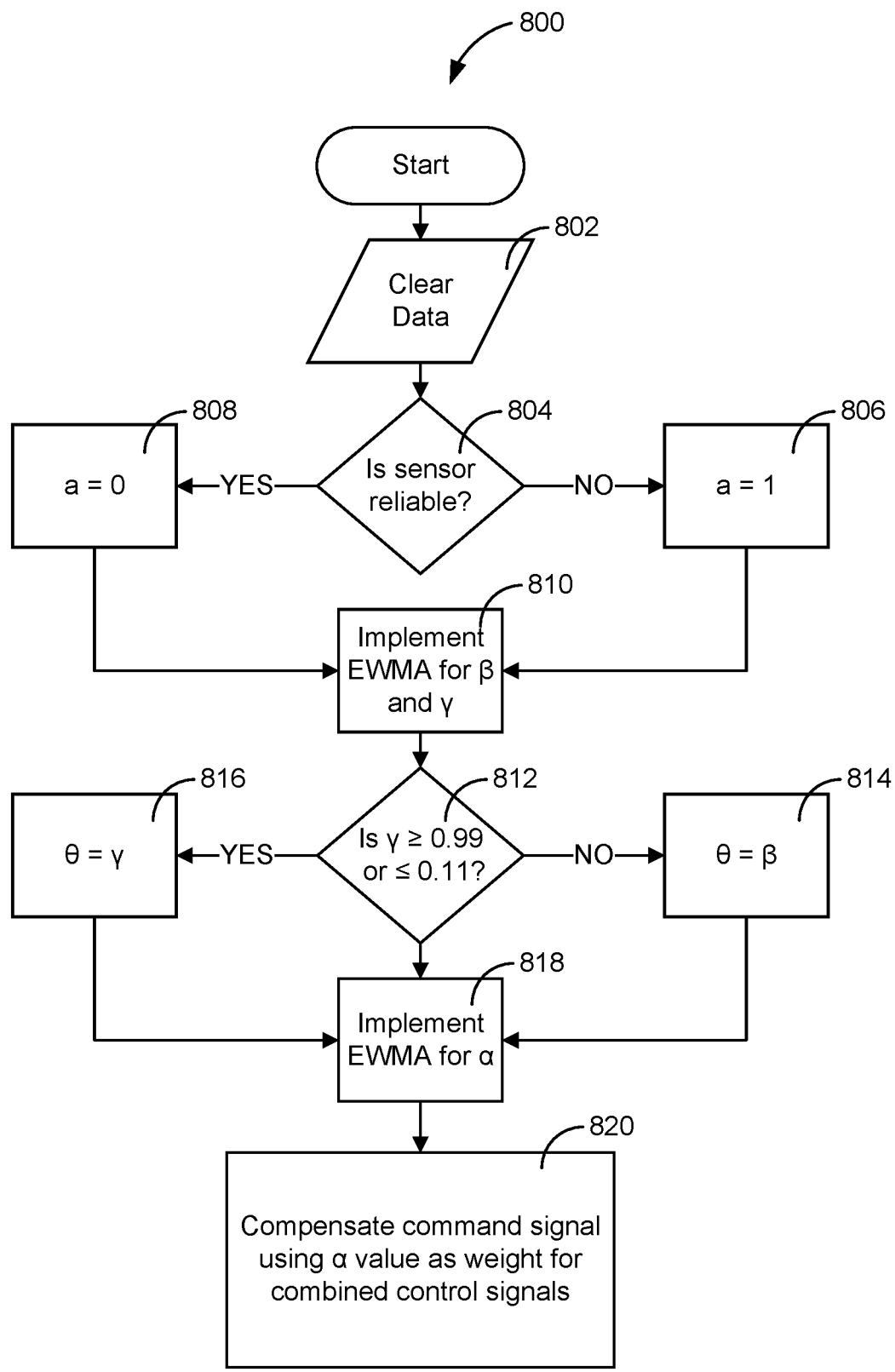
FIG. 8A is a flow diagram of a command compensation process which can be used as part of the flow control loop of FIG. 7A, according to some embodiments.
Figure 8B:
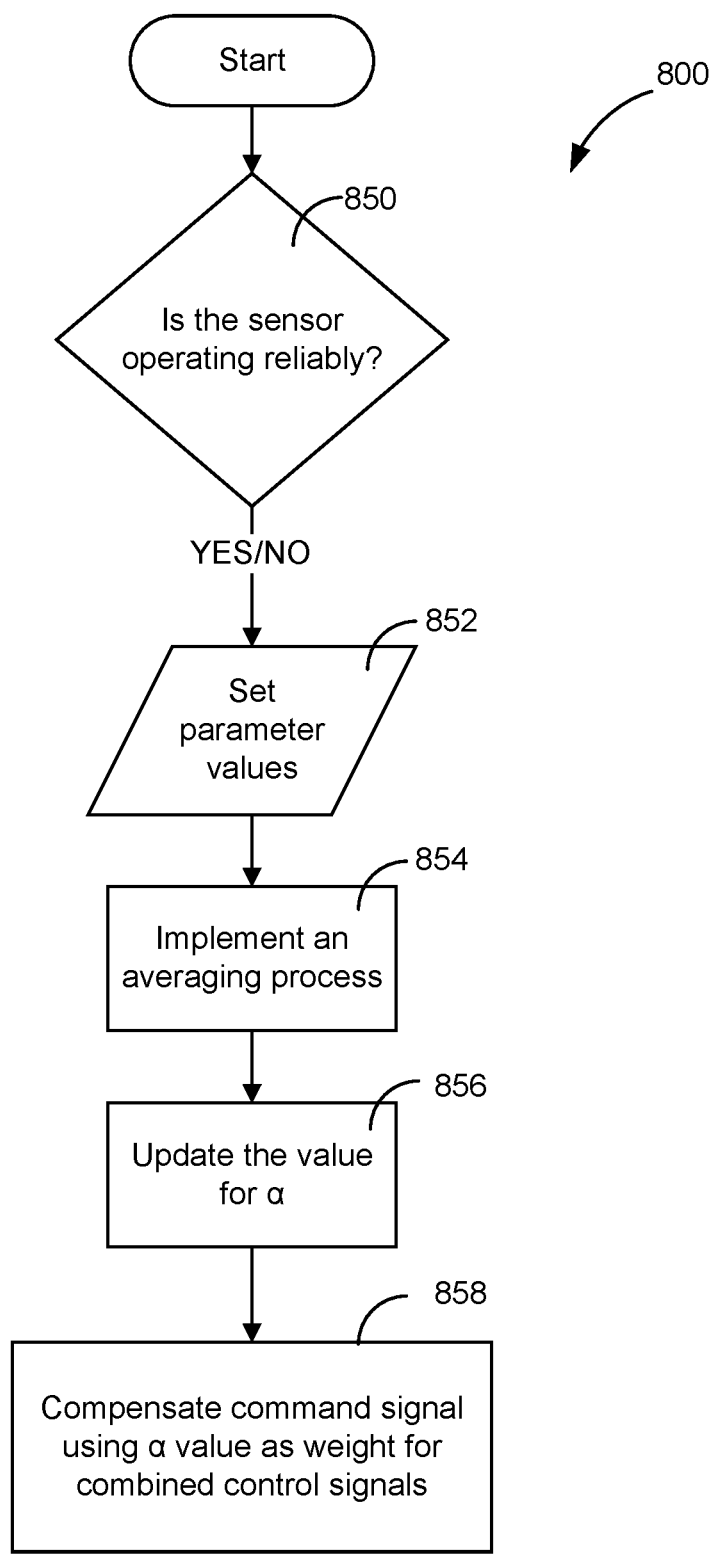
FIG. 8B is a flow diagram of a command compensation process which can be used as part of the flow control loop of FIG. 7A, according to some embodiments.

Referring now to FIGS. 8A-B, a flow diagram of a process for optimizing the command compensation is shown, according to an exemplary embodiment. Process 800 can be initiated by various controllers in a building system. In some embodiments, process 800 is performed within a processing circuit of flow/velocity feedback controller 530.

Referring now to FIG. 8A, an exemplary embodiment of process 800 is shown. FIG. 8A may be a detailed representation of process 800. Process 800 is shown to include clearing data (step 802). In some embodiments, process 800 clears any and all variables (e.g., variables, parameters, token parameters, etc.) before implementing command compensation. Process 800 includes determining if the sensor is reliable (step 804). This step may determine if flow sensor 548 is receiving reliable flow measurements. The purpose of the command compensation may be to produce a linearly combined signal to send to valve actuator 540 that represents the necessary amount of flow compensation required, based upon the reliability of the flow sensor 548 over a given period of time. As such, sensor reliability may need to be continuously tested (e.g., tested in real-time) to ensure reliability is consistently and, if not, adjust accordingly. In some embodiments, reliability is determined by maintaining a certain rate of accurate readings over a given period of time. For example, flow sensor 548 receiving a flow reading of −5.4 gpm, 0.0 gpm, or 1,000 gpm may be considered unreliable. Further detail on reliability is discussed in greater detail below.

Process 800 is shown to include determining that flow sensor 548 is unreliable (step 806). When flow sensor 548 receives an unreliable measurement (e.g., 0.0 gpm, 5000 gpm, etc.), a token placeholder (e.g., "a") may be incremented to a value of 1. The token parameter may not be used directly in the command compensation and is only responsible for adjusting the result of the EWMA filter. Process 800 is shown to include determining that flow sensor 548 is reliable (step 808). When flow sensor 548 receives a reliable measurement, a token parameter (e.g., "a") the value for the token placeholder may remain at zero. The token parameter may not be used directly in the command compensation and is only responsible for helping in calculating results from the EWMA filters.

Process 800 is shown to include implementing an EWMA for β and γ (step 810). In some embodiments, if sensor 548 is reading most of the flow samples by a significant majority or almost none of the flow samples by a significant majority, the optimal scaling factor for a would be 0 or 1, respectively. In some embodiments, a "significant majority" can vary and will depend on the purpose of the implemented system. Since the γ value is a weighted average of previous recordings that indicates the reliability of the sensor, a cutoff point may need to be established to determine the point at which switching the value of α to 0 or 1 when the sensor is significantly reading all or none of the values, respectively, is ideal. In some embodiments, a cutoff point is established with the variable θ shown below:

$$\theta = \begin{cases} 1, & \text{if } \gamma \geq 0.99 \\ 0, & \text{if } \gamma \leq 0.01 \\ \beta, & \text{otherwise} \end{cases} \quad (4)$$

Using the token parameter θ to scale α allows the command compensation to output the optimal control signals to valve actuator 540 when dealing in the extreme cases of consistent reliability or consistent unreliability. The use of token parameter θ is described in greater detail below. The EWMA filter responsible for averaging β values may include the equation shown below. The equation for averaging γ values may look similar. After the token parameter has been adjusted, an EWMA for each β and γ may need to be implemented and average based on a new data set (e.g., original set+1), and adjust β and γ accordingly.

$$\beta = \beta + \frac{1}{T_\beta}(a - \beta) \quad (5)$$

Process 800 is shown to include determining if γ≥0.99 or ≤0.11 (step 812). In some embodiments, if γ is greater than 0.99 or less 0.01, this is indicative of consistently reliable or consistently unreliable measurements. The bounds for consistency (e.g., 0.01 and 0.99) may not always be 0.01 and 0.99 and may be higher/lower. For example, the bounds for γ may be 0.10 and 0.90.

Process 800 is shown to include determining that γ is not outside of the bounds for consistency (step 814). In this step, a second token parameter may be introduced that takes the value of either β or γ. When γ is not outside the bounds for consistency, a second token parameter (e.g., θ) takes on the value of γ. Process 800 is shown to include determining that γ is outside of the bounds for consistency (step 814). In this step, θ takes on the value of β.

Process 800 is shown to include implementing an EWMA for a (step 818). The value of θ is incorporated in the EWMA to incrementally move the value of α towards a more proportional and accurate value. Process 800 is shown to include compensating the command signal to valve actuator 540 using the α value as the weight for the combined control signals (step 820). Once the value of α has been determined, valve command 570 is compensated with flow velocity command 704 and proportionally weighted based on the value of α.

Referring now to FIG. 8B, an exemplary embodiment of process 800 is shown. FIG. 8B shows a high-level representation of process 800, which is described in greater detail in FIG. 8A. Process 800 is shown to include determining whether flow sensor 548 is reliable (step 850).

Process 800 is shown to include setting the parameter values (step 852). In some embodiments, parameter values may refer to scaling factors (e.g., a) for the linear combination of signals from one or more controllers in the command compensation block 702. In other embodiments, parameter values may refer to placeholder variables (e.g., a, Θ, etc.) that indirectly scale the linear combination of signals. In the exemplified embodiment, observation at a single instance in time may appear evident that the flow sensor 548 is either working reliably or unreliably. When flow sensor 548 is observed over a period of time (e.g., 1 day), the rate at which the sensor is reliable can change over time. This may be due to environmental conditions (e.g., pressure changes in the water, flow sensor noise, building disturbances, set point error, etc.). As such, a process may be implemented to compensate for these changes. In some embodiments, step 852 initializes three variables: α, β, and γ, wherein a represents the scaling factor shown in Equation (1), β represents a parameter proportional to the flow in the non-measureable region, and γ represents the consistency of sensing. Upon determining whether the sensor is reliable or unreliable, α may be set to 1 or 0, respectively.

Process 800 is shown to include implementing an averaging process (step 854). Command compensation may be implemented in real-time, and samples (e.g., flow readings) may be taken by at a certain time interval. In some embodiments, exponentially weighted moving averages (EWMA) may be implemented wherein the weighting decreases exponentially with each previous sample. Equations for this process can be shown below:

$$\beta = \beta + \frac{1}{T_\beta}(a - \beta) \quad (6)$$

$$\gamma = \gamma + \frac{1}{T_\gamma}(a - \gamma) \quad (7)$$

In some embodiments, $T_\gamma$ and $T_\beta$ can be shown to represent a time variable. In one example, the time interval for $T_\gamma$ is relatively small to $T_\beta$, as the γ value needs to be updated through a EWMA at a rate fast enough to give accurate readings on the reliability of the sensor. For example, $T_\gamma$ may be set at 60 seconds while $T_\beta$ is set at 1 day. However $T_\beta$ represents the general proportion of flow in the non-measurable region and may not need to change as quickly. Due to the continuous-time nature of the command compensation, samples are being taken at a certain time interval. In some embodiments, exponentially weighted moving averages (EWMA) may be implemented wherein the weighting decreases exponentially with each previous sample. An equation for this process can be shown below:

$$\alpha = \alpha + \frac{1}{T_\alpha}(\theta - \alpha) \quad (8)$$

Where $T_\alpha$ represents a time interval small enough to achieve accurate values from the EWMA (e.g., 1 minute).

Process 800 is shown to include updating the value for a (step 856). In some embodiments, α is updated by implementation of an EWMA filter based on the value of θ. Process 800 is shown to include compensating the command signal using the value of α as the weight for the combined control signals (step 858). Once the value of α has been determined, valve command 570 is compensated with flow velocity command 704 and proportionally weighted based on the value of α.

Command Compensation Solutions

Figure 9:
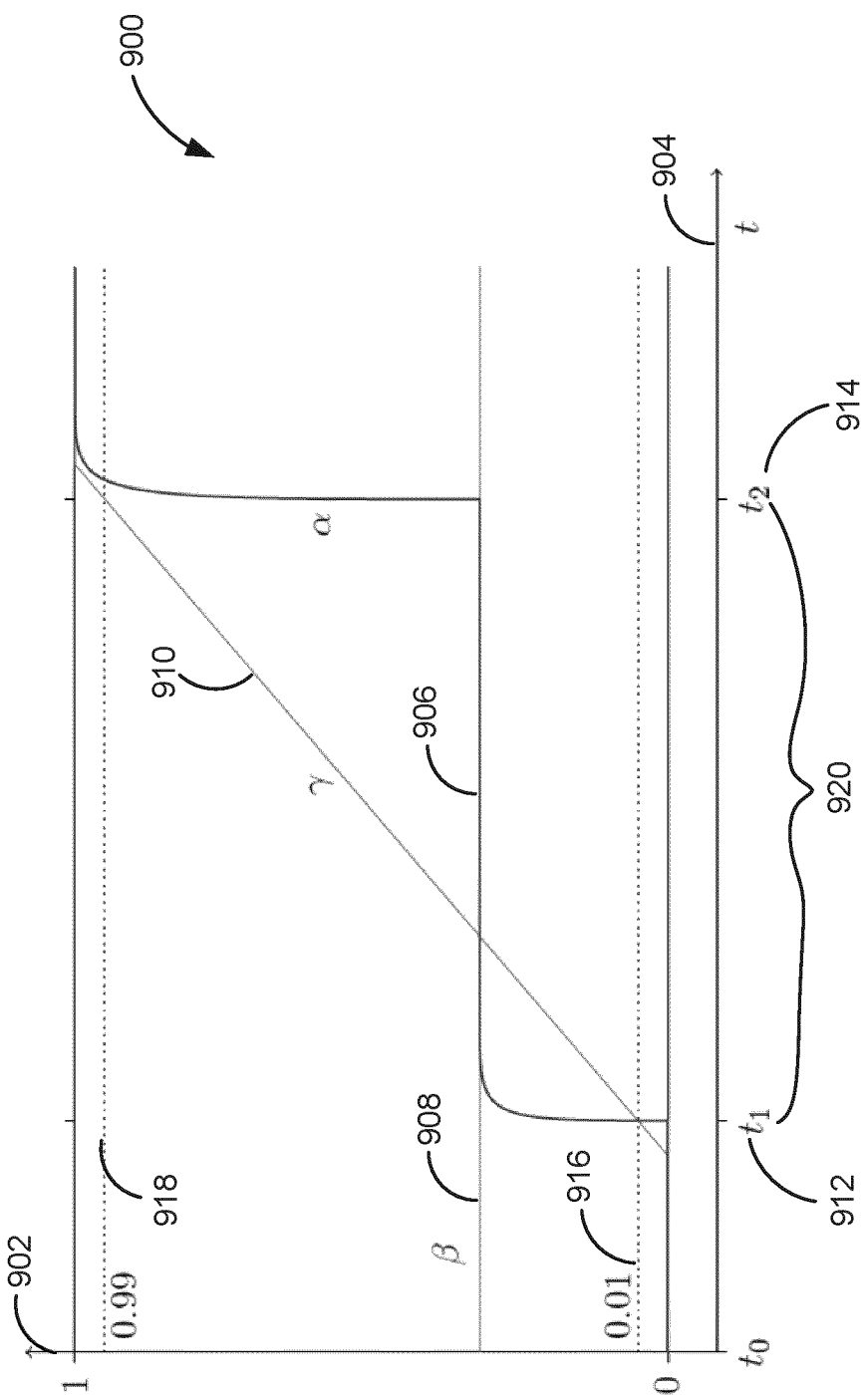
FIG. 9 is a graph illustrating a command compensation process which can be used as part of the flow control loop of FIG. 7A, according to some embodiments.

Referring now to FIG. 9, a graph 900 showing the variations of scaling factors for command compensation block 702 is shown, according to an exemplary embodiment. Graph 900 is shown to include vertical axis 902 and horizontal axis 904. Vertical axis 902 shows the magnitude of the variables α, β, and γ, on a scale from 0 to 1. Horizontal axis 904 shows a time axis in seconds. Graph 900 is shown to include first time 912, second time 914, and time interval 920 on horizontal axis 904. First time 912 and second time 914 are arbitrary times for the exemplified embodiment, and time interval 965 between them may be established at any rate. In some embodiments, graph 900 may show the variations of one or all scaling factors processed in the command compensation block 702.

Graph 900 is shown to include α line 906, β line 908, and γ line 910. Line 906 represents the change in the α scaling factor over the time interval 965. Line 908 represents the change in the θ scaling factor over the time interval 965. Line 910 represents the change in the γ scaling factor over the time interval 920. Graph 900 is also shown to include lower cutoff value 916 and upper cutoff value 918. Lower cutoff value 916 represents the point at which a will switch to a value of 0 when the lower cutoff value 916 is reached by γ. Upper cutoff value 918 represents the point at which a will switch to a value of 1 when the upper cutoff value 918 is reached by γ.

In some embodiments, graph 900 represents a time-varying representation of how the three scaling factors in command compensation block 702 change over time. In one example, flow sensor 610 may be operating reliably prior to first time 912. At or around first time 912, flow sensor 548 begins to malfunction, resulting in an increase in γ. When this occurs, a may switch from the value of 0, representing reliability, to the value of 0 after passing the lower cutoff value 916. The α value may not directly jump to the value of 1, as a constant switch between 0 and 1 can cause issues in the zone temperature controller 524 or flow controller 604 or both. Instead, the α value will remain at the 0 value until γ reaches the upper cutoff value 918. At this point, the system has been operating unreliably for a significant amount of time and the α value will switch to 1. The values of α, β, and γ may be calculated by means of EWMA's. This may be especially true for the value of γ, as a weighted average of this value indicated how reliable or unreliable the system has been over time interval 965, allowing the α value to be optimized in the extreme cases.

Still referring to FIG. 9, the performance of the command compensation algorithm may be tested with a simulation of building zone 506. In some embodiments, the system is perturbed with setpoint changes in zone temperature, pressure changes in the control valve (e.g., valve 546) and disturbances in the building caused by changes in occupancy. The performance of the system may be evaluated first when flow sensor 548 can measure any amount of flow ($y_{min}$=0 gpm), and then it is compared to how it changes for different values of $y_{min}$.

In an exemplary embodiment, the values of $y_{min}$ tested are 0, 5, 10, 20 and 50% of the maximum value flow sensor 548 can read (e.g., $y_{max}$=12 gpm). This may be written as $y_{min}$=[0; 0:6; 1:2; 2:4; 6] gpm. The time constants of the EWMAs for the calculation of a in are: $\tau_\alpha$=60 sec., $T_\gamma$=60 sec., $\tau_\beta$=86400 sec (e.g., 1 day).

In some embodiments, the performance metrics calculated are the average setpoint error, and average actuator effort. The average setpoint error is calculated as $$\overline{e_k} = \frac{1}{N}\sum_{k=1}^{N}|r_{T,k} - y_{T,k}|$$

and the average effort in the actuator, calculated as $$\overline{\delta u_k} = \frac{1}{N} \sum_{k=1}^{N-1} |\hat{u}_{v,k+1} - \hat{u}_{v,k}|$$

In these equations, the terms $r_{T,k}$, $y_{T,k}$ and $\hat{u}_{v,k}$ correspond to the temperature setpoint, temperature measurement and compensated valve command at each sample time k, respectively. The term N may be the number of samples used to calculate the averages. In some embodiments, the simulation is sampled every 1 second and is run for 5 days, but only the last 3 days of data collected are used to calculate the performance metrics in order to let the controllers achieve stable tuning parameters; this makes N=259201.

Figure 10:
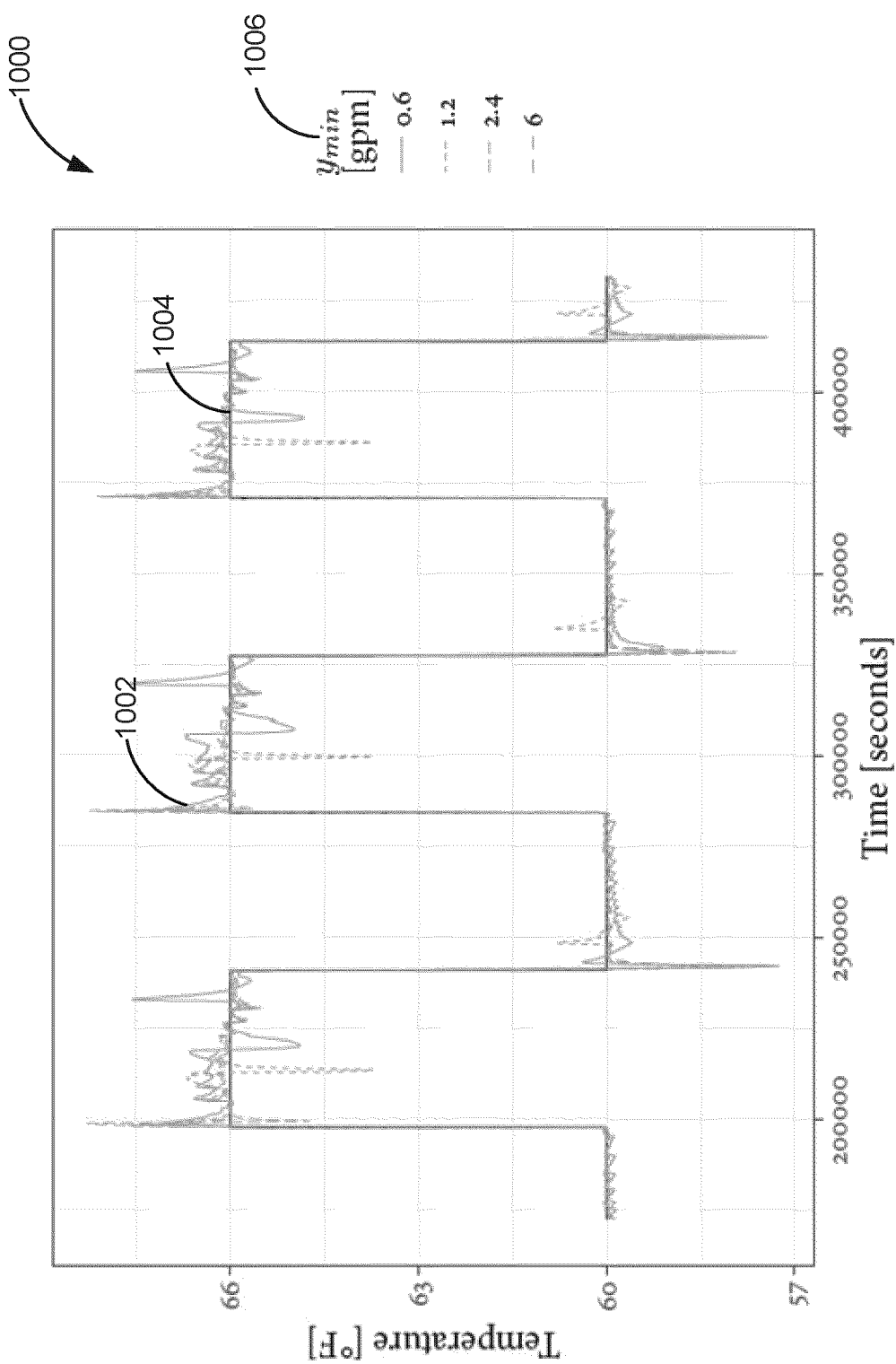
FIG. 10 is a graph illustrating the results of a command compensation process which can be used as part of the flow control loop of FIG. 7A, according to some embodiments.

Referring now to FIG. 10, a simulation result 1000 is shown. Simulation result 1000 shows the change in temperature of building zone 506 over a period of time and is shown to include experimental data lines 1002, theoretical data line 1004, and legend 1006. In some embodiments, simulation result 1000 shows the results of implementing the command compensation block 702, as depicted in FIGS. 7-8B.

In one example, the performance of the command compensation block 702 is tested with a simulation of feedback control system 500. The simulation is made to include system disturbances by means of set point error, pressure changes in valve 546, and building disturbances (e.g., building deterioration, fires, etc.). The simulation shows temperature of building zone 506 when flow sensor 548 is able to measure any amount of flow (i.e., no lower cutoff value) and when flow sensor 548 has various different minimum readable values (dashed lines). Legend 1006 shows a plurality of different minimum sensor specifications for flow sensor 548. As shown in simulation result 1000, the command compensation block may appear successful as temperature from experimental data lines 1002 appears to converge to temperature from theoretical data line 1004 after overshoot. As depicted by theoretical data line 1004, flow sensor 548 is always operating reliably, allowing the command compensation block 702 to maintain a constant scaling factor 0. This may allow the command compensation block 702 to only input signals from flow/velocity feedback controller 530, allowing for smoother temperature changes. Experimental data lines 1002 are shown to represent flow sensor 548 operating reliably at varying rates, allowing command compensation block 702 to implement command compensation.

Figure 11:
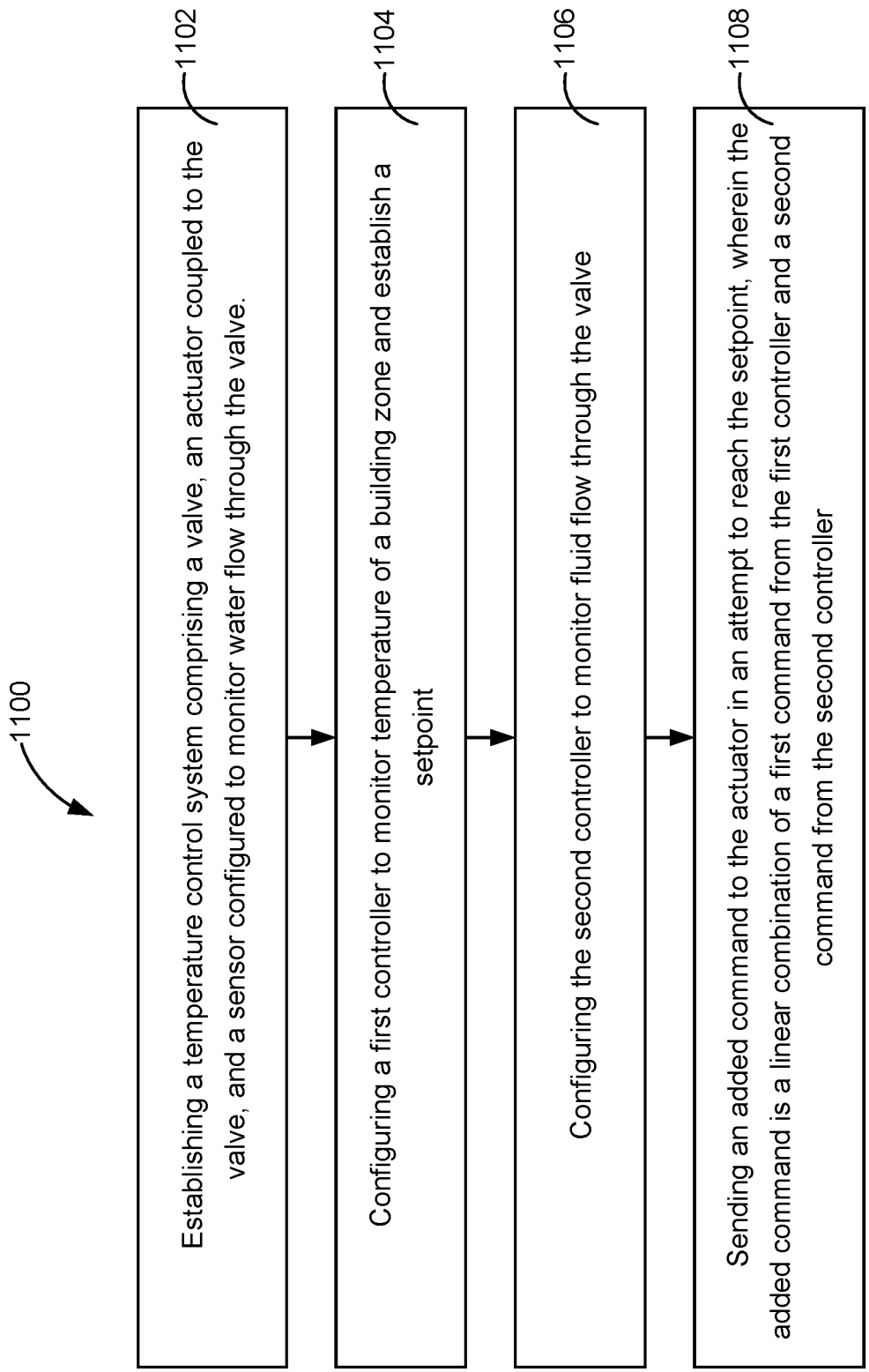
FIG. 11 is a flow diagram of a process for implementing command compensation which can be used as part of the flow control loop of FIG. 7A, according to some embodiments.

Referring now to FIG. 11, a flow diagram of process 1100 for controlling the temperature of an HVAC system by means of command compensation is shown, according to an exemplary embodiment. Process 1100 may represent a high-level process of implementing command compensation within system 500. Process 1100 can be performed by various controllers in a building control system. For example, process 1100 can be implemented by flow control loop 700, as shown in FIGS. 7A-B.

Process 1100 is shown to include establishing a temperature control system comprising a valve, an actuator coupled to the valve, and a sensor configured to monitor water flow through the valve (step 1102). Step 1102 may be implemented as system 500. In some embodiments, step 1102 includes establishing valve 546, actuator 502, and flow sensor 548.

Process 1100 is shown to include configuring a first controller to monitor temperature of a building zone and establish a setpoint (step 1104). This step may be performed by controller 504 or zone temperature controller 524. In some embodiments, these two controllers are not separate in functionality and output a single command to flow/velocity span block 526.

Process 1100 is shown to include configuring the second controller to monitor fluid flow through the valve (step 1106). This step may be performed by flow/velocity feedback controller 530.

Process 1100 is shown to include sending an added command to the actuator in an attempt to reach the setpoint, wherein the added command is a linear combination of a first command from the first controller and a second command from the second controller (step 1108). This step may be performed by a control application (e.g., command compensation block 702) communicably coupled to the actuator, wherein the added command adjusts a valve based on the reliability of a sensor. In some embodiments, an added signal from zone temperature controller 524 and flow/velocity feedback controller 530 may be sent to valve actuator 540 to adjust valve 546.

Referring now to FIG. 12, another embodiment of loop 700 is shown, according to some embodiments. FIG. 12 is shown to include a variety of system disturbances, including setpoint changes 1204, pressure changes 1206, building disturbances 1208, and flow sensor noise 1210. System disturbances 1204-1210 may be directed to various disturbances that produce noise, or other unwanted information within control system signals (e.g., feedback signals, temperature setpoints, flow setpoints, control signals, etc.). Loop 700 is further shown to include zone model 1202 and ZNT sensor noise 1212. In some embodiments, Zone model 1202 is a virtual representation of a building zone that may be used as part of a simulation for system 700. ZNT sensor noise may be an additional system disturbance, such as pressure changes 1206. In some embodiments, ZNT sensor noise is virtual noise implemented for zone model 1202 to represent noise in a simulated environment.

The above figures may disclose a way to overcome the inability of flow sensors to measure low flows in a cascaded control system. The method combines linearly the commands given by the controllers in the inner and outer loops, which in some embodiments are flow and temperature controllers. By performing this combination, a process can transition from controlling a valve exclusively with the flow controller, to controlling it with the temperature controller when the flow sensor provides unreliable measurements or it completely fails. Simulations can show the process is tacks setpoint and disturbances at the expense of actuator effort. Although this process may be applied to a cascaded temperature control system, the compensation method can potentially be applied to any cascaded control system.

In some embodiments, a benefit of having the inner loop that can perform pressure rejection in flow control decreases as the outer command is used more. This may happen because the outer controller provides most of the control command to the valve, and it will take longer to reject disturbances in the inner loop since the disturbance effects have to be manifested in the outer loop before the outer controller takes a corrective action. However, the command from the outer controller will be used more only when a sensor in the inner loops has failed to provide reliable measurements; this situation is equivalent to having an inner open loop.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A control system for use with a flow sensor associated with a valve and an actuator coupled to the valve, the control system comprising:
   a first controller; and
   a second controller, wherein the first controller is configured to provide a flow rate setpoint for the second controller and a first flow command for the second controller; and
   wherein the second controller is configured to:
   monitor fluid flow through the valve;
   generate a second flow command;
   provide a control signal for the actuator in response to a weighted value of the first flow command, wherein the first flow command and second flow command are related to reliability of the flow sensor.

2. The system of claim 1, wherein providing the control signal for the actuator in response to the weighted value of the first flow command comprises providing the control signal for the actuator in response to the weighted value of the first flow command and in response to a weighted value of the second flow command or both.

3. The system of claim 2, wherein providing the control signal for the actuator in response to the weighted value of the first flow command comprises:
   scaling the value of the first flow command and the second flow command such that the scaling of the first flow command and the second flow command is at least partially based on the reliability of the flow sensor; and
   providing the control signal for the actuator in response to the scaled value of the first flow command and in response to the scaled value of the second flow command.

4. The system of claim 1, wherein providing the control signal for the actuator in response to the weighted value of the first flow command comprises receiving, in a building zone, the flow rate setpoint for the second controller, the second controller configured to reach the flow rate setpoint by adjusting water flow through the valve.

5. The system of claim 1, wherein the actuator, the second controller, and the flow sensor are configured to operate within a single actuator assembly.

6. The system of claim 1, wherein the second controller is further configured to:
   provide the control signal for the actuator in response to the weighted value of the first flow command to a third controller, wherein the third controller is configured to combine the first flow command and the second flow command to generate a combined control signal; and
   provide the combined control signal to the actuator.

7. The system of claim 1, wherein at least one of the first flow command and the second flow command is inversely related to the reliability of the flow sensor.

8. The system of claim 1, wherein the weighted value of the first flow command is inversely related to the reliability of the flow sensor.

9. The system of claim 1, wherein the weighted value of the second flow command is positively correlated with the reliability of the flow sensor.

10. The system of claim 1, wherein the first controller is configured to provide the flow rate setpoint and the first flow command based on a temperature of the fluid flow through the valve.

11. The system of claim 1, wherein the first flow command is based on a first sensed parameter, and wherein the second flow command is based on a second sensed parameter, the second sensed parameter being a flow rate through the valve.

12. The system of claim 1, wherein the first controller is further configured to provide the first flow command in response to an error value from the second controller, wherein the error value is based on the reliability of the flow sensor.

13. A control system for use with a flow sensor associated with a valve and an actuator coupled to the valve, the control system comprising:
   a first controller; and a second controller, wherein the first controller is configured to provide a flow rate setpoint for the second controller and a first flow command for the second controller; and wherein the second controller is configured to:
monitor fluid flow through the valve;
generate a second flow command;
provide a control signal for the actuator in response to a weighted value of the first flow command, wherein the first flow command and second flow command are related to reliability of the flow sensor, wherein providing the control signal for the actuator in response to the weighted value of the first flow command comprises:
partially receiving the first flow command from the first controller as a portion of the control signal such that the weighted value of the first flow command is substantially zero when the flow sensor is consistently reliable; and
providing a feedback signal from the second controller as a portion of the control signal such that a weighted value of the feedback signal is substantially zero when the flow sensor is consistently unreliable, wherein the feedback signal comprises flow rate measurements to act as feedback from the flow sensor to the second controller.

14. The system of claim 13, wherein the first controller is configured to provide the flow rate setpoint and the first flow command based on a temperature of the fluid flow through the valve.

15. A control system for use with a flow sensor associated with a valve and an actuator coupled to the valve, the control system comprising:
a first controller; and
a second controller, wherein the first controller is configured to provide a flow rate setpoint for the second controller and a first flow command for the second controller; and
wherein the second controller is configured to:
monitor fluid flow through the valve;
generate a second flow command;
provide a control signal for the actuator in response to a weighted value of the first flow command, wherein the first flow command and second flow command are related to reliability of the flow sensor, wherein providing the control signal for the actuator in response to the weighted value of the first flow command comprises:
operating reliably when the flow sensor is providing accurate readings to the second controller substantially more frequently than when the flow sensor is providing inaccurate readings to the second controller in a first predetermined time period; and
operating unreliably when the flow sensor is providing inaccurate readings to the second controller substantially more frequently than when the flow sensor is providing accurate readings to the second controller in a second predetermined time period.

16. The system of claim 15, wherein the first controller is configured to provide the flow rate setpoint and the first flow command based on a temperature of the fluid flow through the valve.

17. A control system for use with a flow sensor associated with a valve and an actuator coupled to the valve, the control system comprising:
a first controller; and
a second controller, wherein the first controller is configured to provide a flow rate setpoint for the second controller and a first flow command for the second controller; and
wherein the second controller is configured to:
monitor fluid flow through the valve;
generate a second flow command;
provide a control signal for the actuator in response to a weighted value of the first flow command, wherein the first flow command and second flow command are related to reliability of the flow sensor, and
wherein providing the control signal for the actuator in response to the weighted value of the first flow command comprises weighting the first flow command by a scaling factor, wherein the scaling factor is based on the reliability of the flow sensor and is a constant value when the flow sensor is consistently reliable or unreliable.

18. The system of claim 17, wherein the first controller is configured to provide the flow rate setpoint and the first flow command based on a temperature of the fluid flow through the valve.

19. A control system for use with a flow sensor associated with a valve and an actuator coupled to the valve, the control system comprising:
a first controller; and
a second controller, wherein the first controller is configured to provide a flow rate setpoint for the second controller and a first flow command for the second controller; and
wherein the second controller is configured to:
monitor fluid flow through the valve;
generate a second flow command;
provide a control signal for the actuator in response to a weighted value of the first flow command, wherein the first flow command and second flow command are related to reliability of the flow sensor, and
wherein providing the control signal for the actuator in response to the weighted value of the first flow command comprises averaging, with a moving average filter, a plurality of measurements from the flow sensor to determine if the flow sensor is consistently reliable or unreliable.

20. The system of claim 19, wherein the first controller is configured to provide the flow rate setpoint and the first flow command based on a temperature of the fluid flow through the valve.

* * * * *